US006792454B2

(12) United States Patent
Nakano et al.

(10) Patent No.: US 6,792,454 B2
(45) Date of Patent: Sep. 14, 2004

(54) SYSTEM AND METHOD FOR WEBSITE DEVELOPMENT

(75) Inventors: Russell T. Nakano, Sunnyvale, CA (US); Terrence T. W. Yee, Saratoga, CA (US); Britt H. Park, Mountain View, CA (US); Sanford L. Barr, Sunnyvale, CA (US); Jack S. Jia, San Jose, CA (US); Gajanana Hegde, San Jose, CA (US); Kevin Cochrane, Palo Alto, CA (US)

(73) Assignee: Interwoven, Inc., Sunnyvale, CA (US)

( * ) Notice: Subject to any disclaimer, the term of this patent is extended or adjusted under 35 U.S.C. 154(b) by 0 days.

(21) Appl. No.: 10/256,902

(22) Filed: Sep. 27, 2002

(65) Prior Publication Data

US 2003/0028517 A1 Feb. 6, 2003

Related U.S. Application Data

(63) Continuation of application No. 09/244,333, filed on Feb. 3, 1999, now Pat. No. 6,505,212.
(60) Provisional application No. 60/073,766, filed on Feb. 4, 1998.

(51) Int. Cl.[7] ............................................... G06F 13/00
(52) U.S. Cl. ........................ 709/219; 709/225; 709/229; 707/10

(58) Field of Search ................................. 709/203, 217, 709/219, 223, 225, 227, 228, 229; 719/328, 329; 707/10, 100, 104, 3, 204

(56) References Cited

U.S. PATENT DOCUMENTS 5,870,552 A * 2/1999 Dozier et al. ................ 709/219
6,189,000 B1 * 2/2001 Gwertzman et al. ........... 707/1
6,209,036 B1 * 3/2001 Aldred et al. ............... 709/229

* cited by examiner

Primary Examiner—Viet D. Vu
(74) Attorney, Agent, or Firm—Glenn Patent Group; Michael A. Glenn

(57) ABSTRACT

A system and method for file management is comprised of hierarchical files systems, referred to as "areas." There are three types of areas: work areas, staging areas, and edition areas. A work area is a modifiable file system, and, in a work area a user can create, edit, and delete files and directories. A staging area is a read-only file system that supports select versioning operations. Various users of work areas can integrate their work by submitting the contents of their work area to the staging area. In the staging area, developers can compare their work and see how their changes fit together. An edition is a read-only file system, and the contents of a staging area are virtually copied into an edition to create a frozen, read-only snapshot of the contents of the staging area. One use of the system and method for file management is as a website development tool.

2 Claims, 30 Drawing Sheets

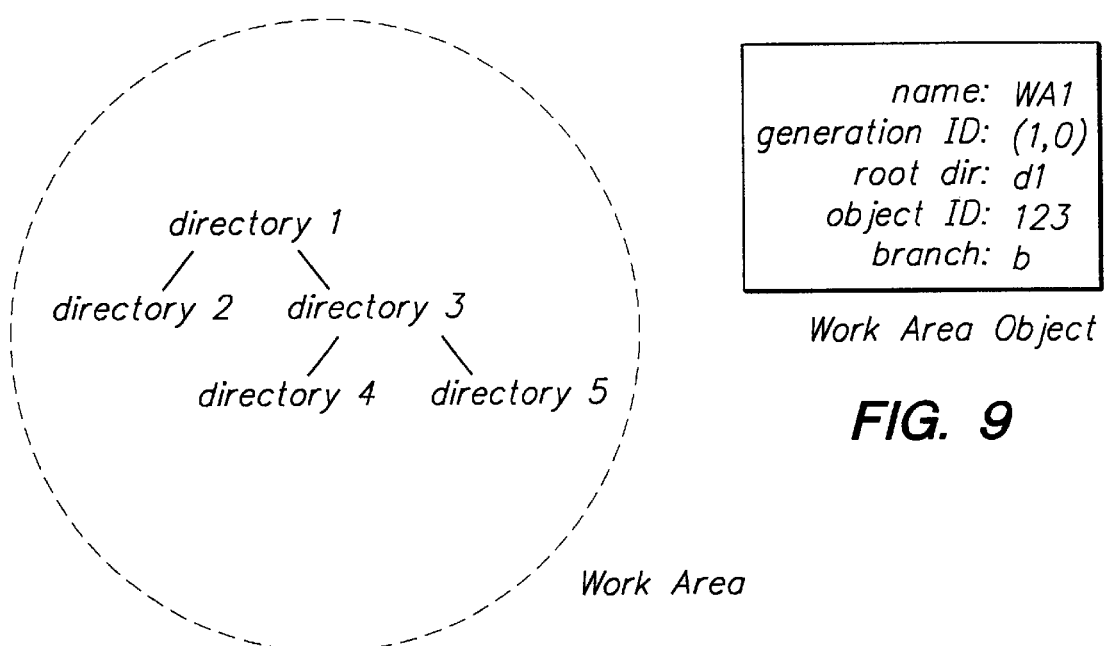
Work Area Object
FIG. 9
FIG. 8
Deriving a Generation ID from a parent Generation ID.
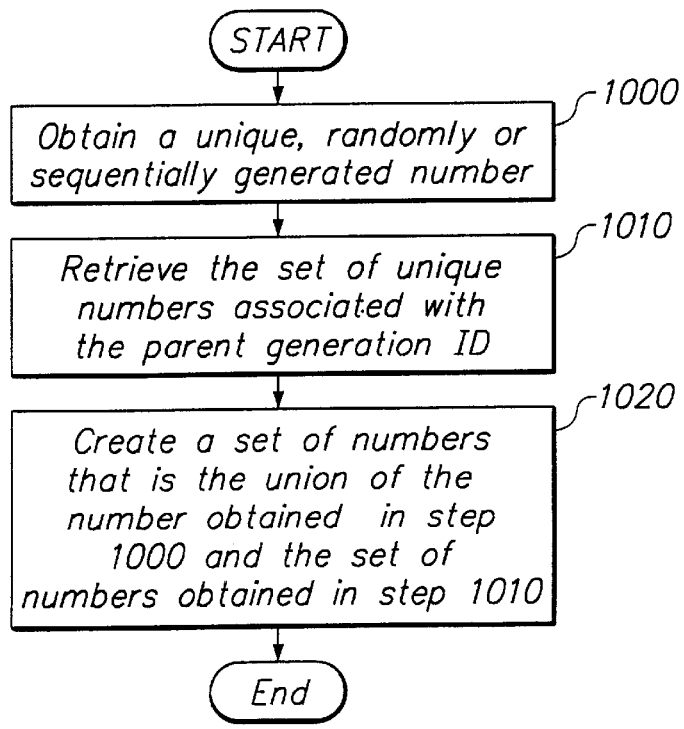
FIG. 10

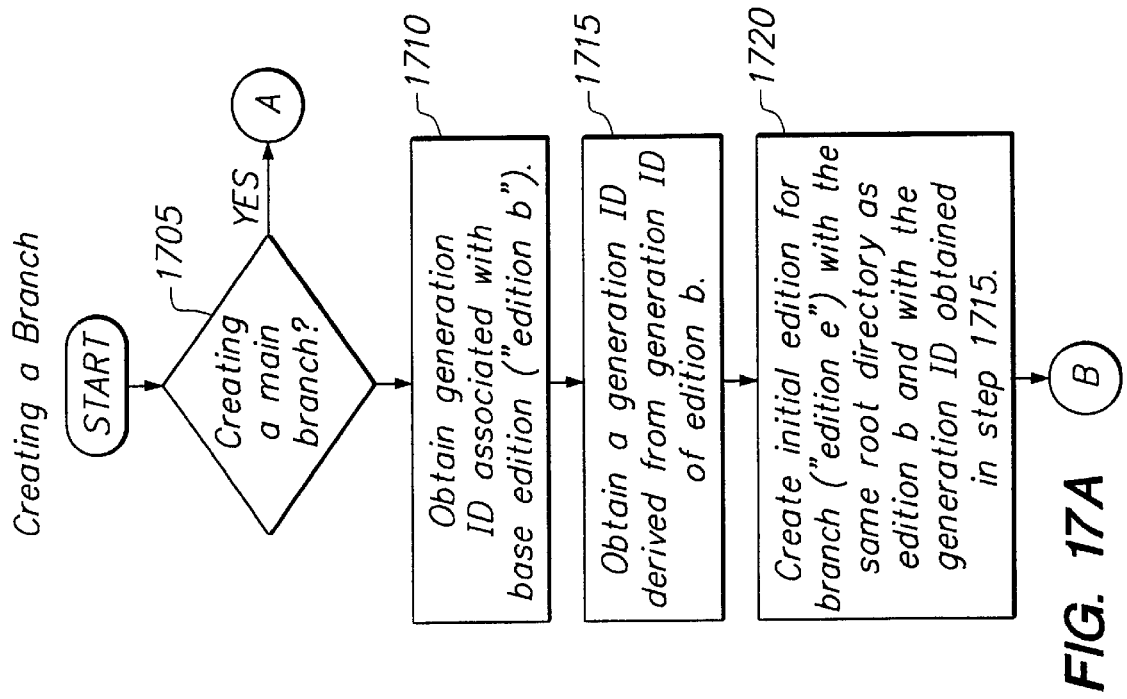
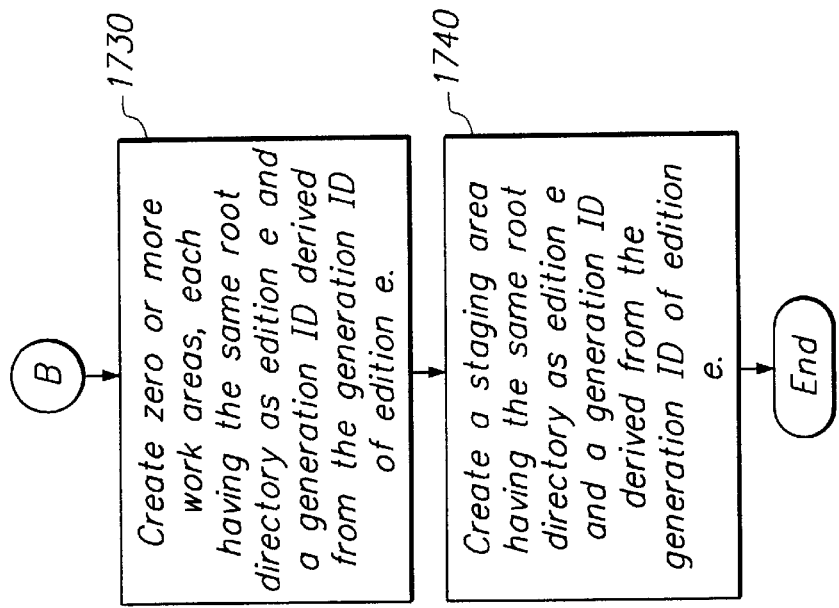
FIG. 17A
FIG. 17B

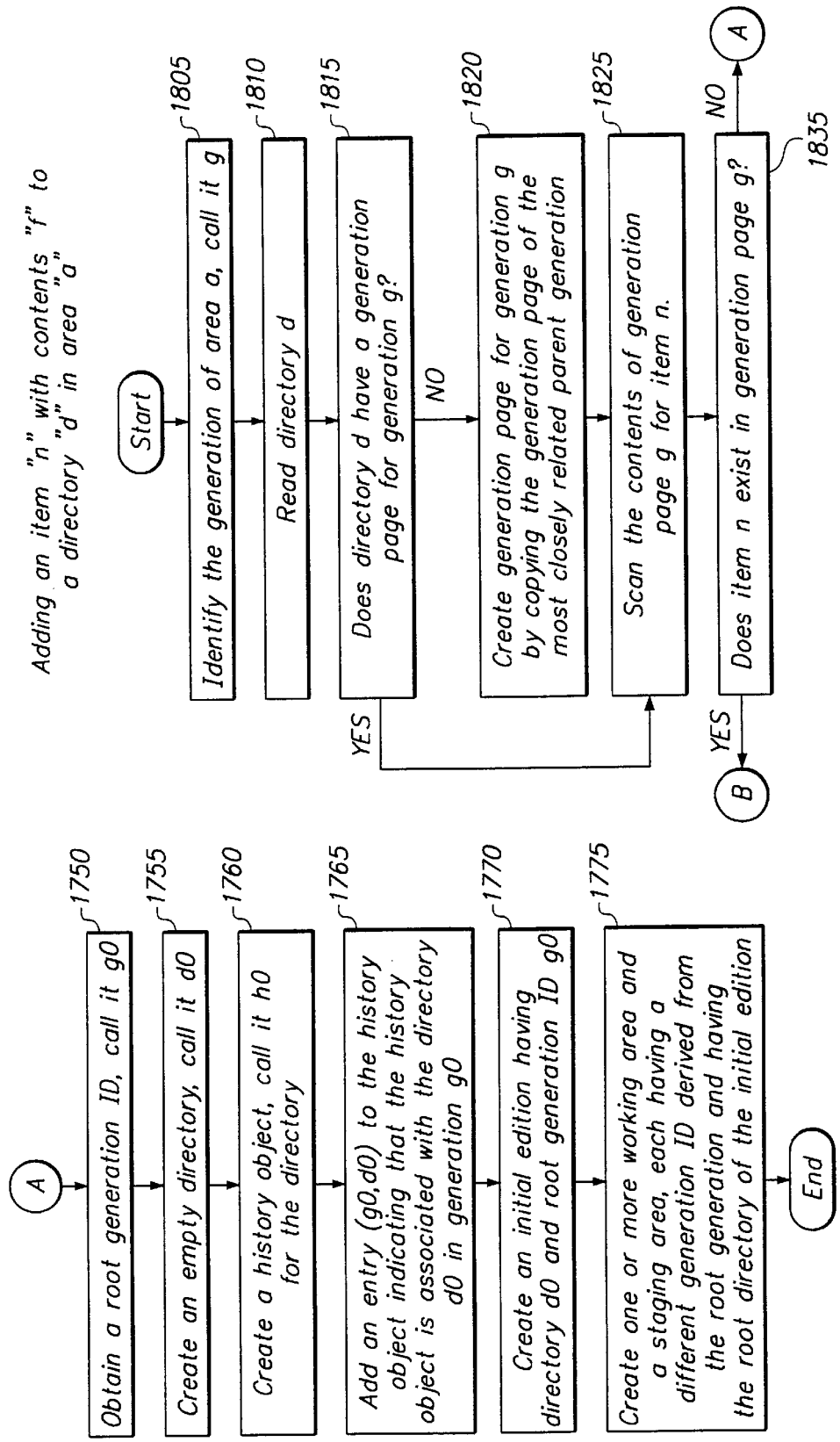

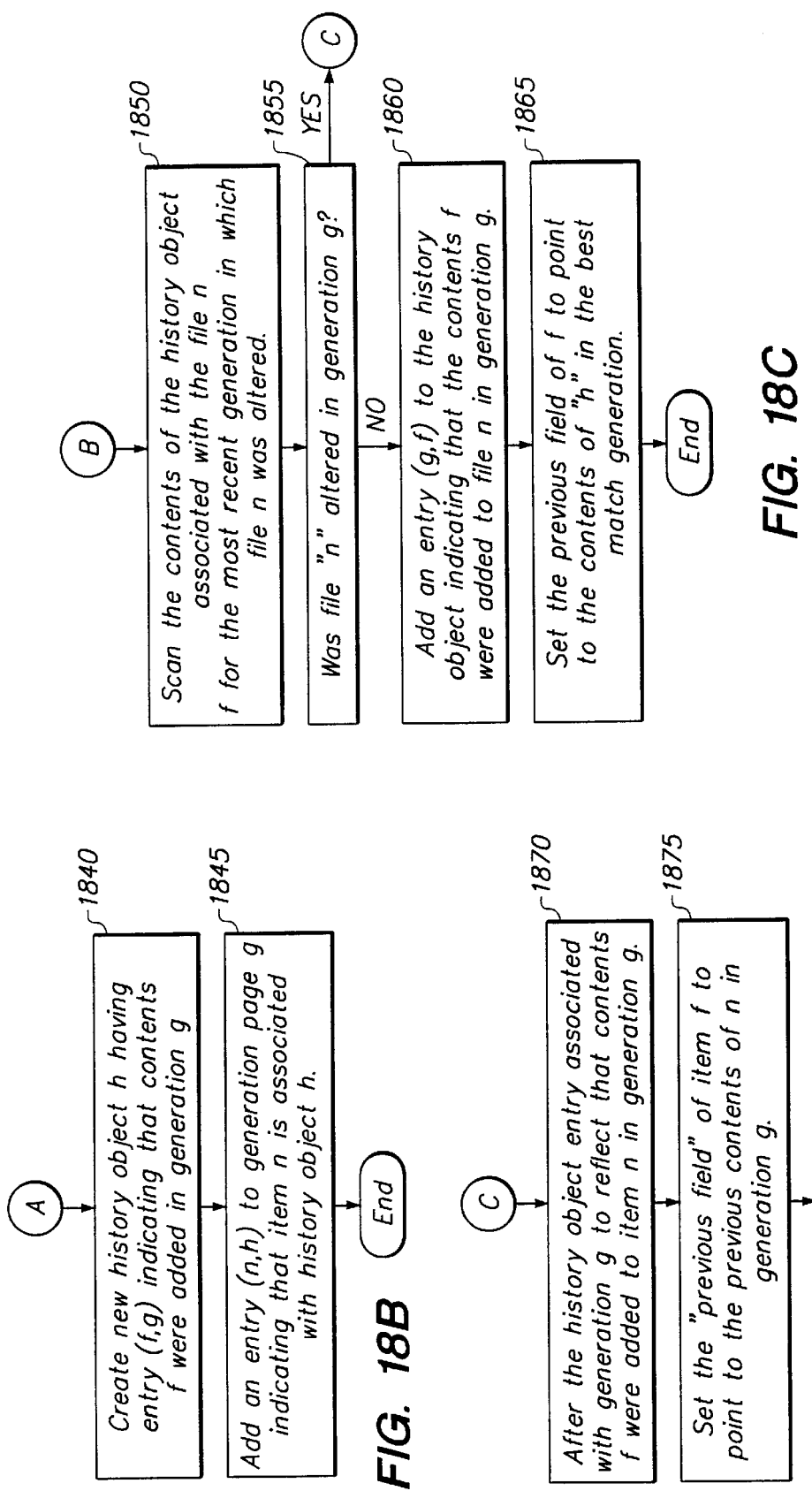

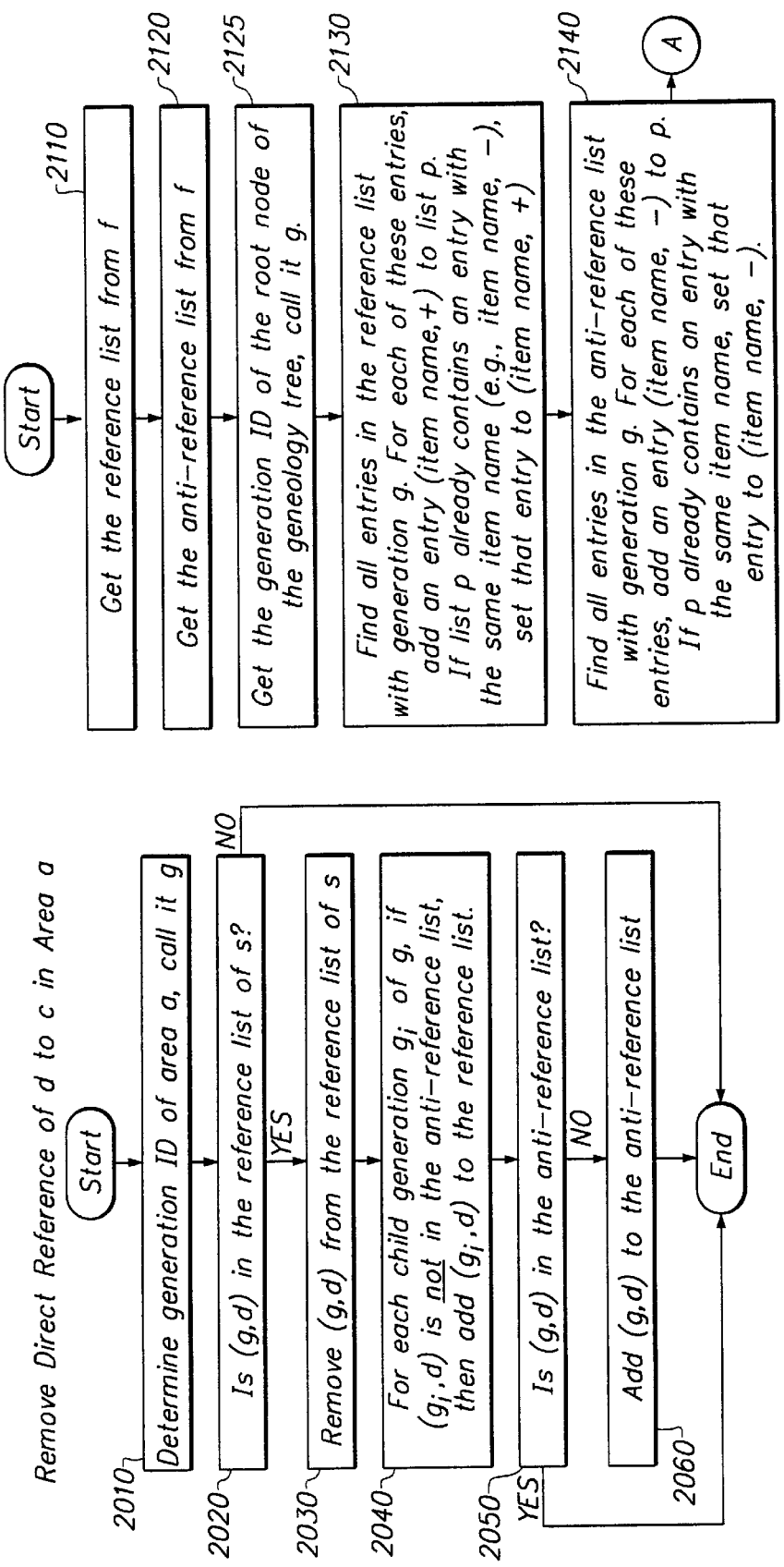

Editing a file "n" in work area a (generation g) in directory d

Generating a base name for a history object h in directory d in area a

Submitting an item "n" w/history object "h" and contents "f" directory "d" in staging Area "a" having generation ID "g".

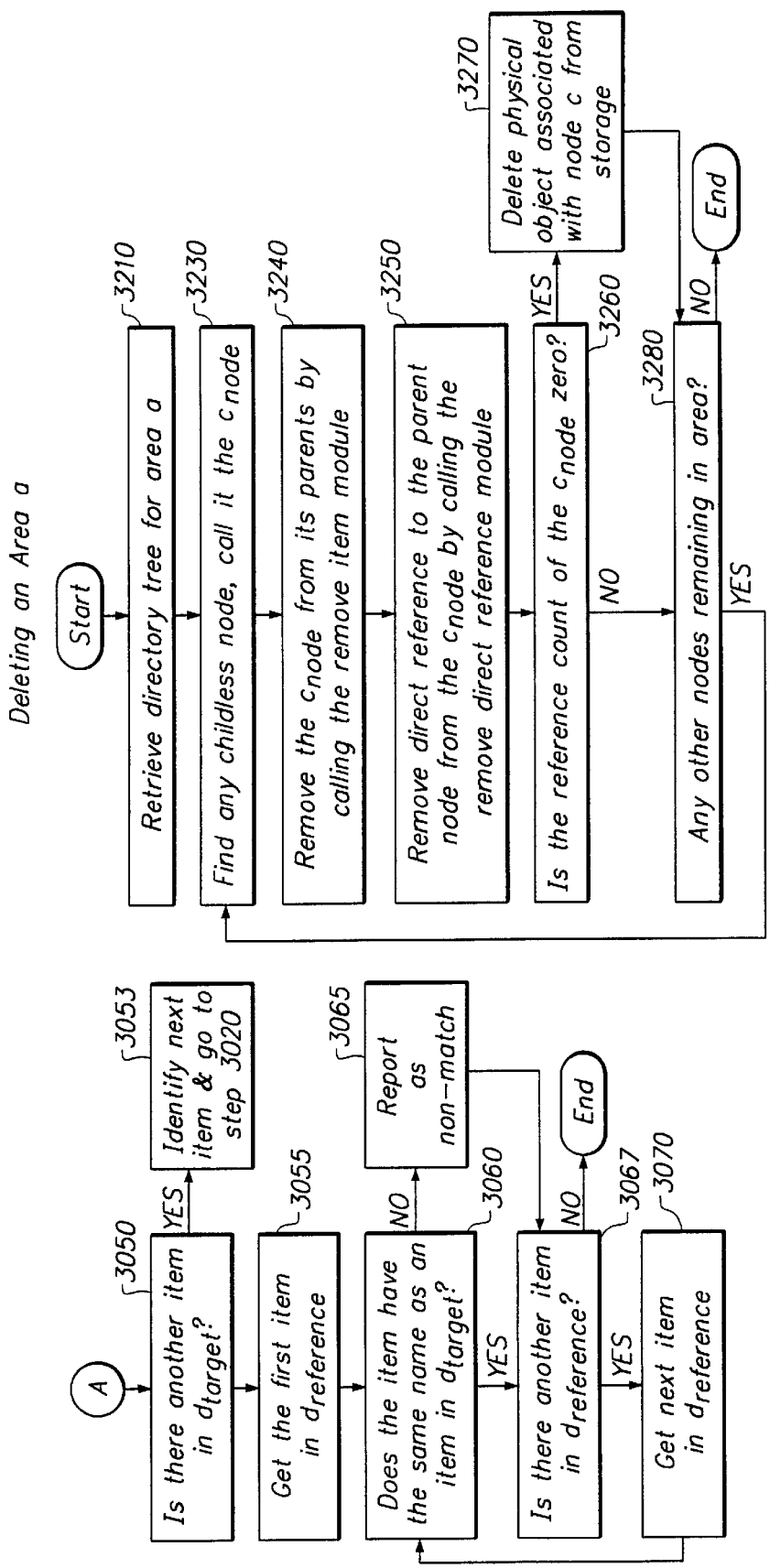

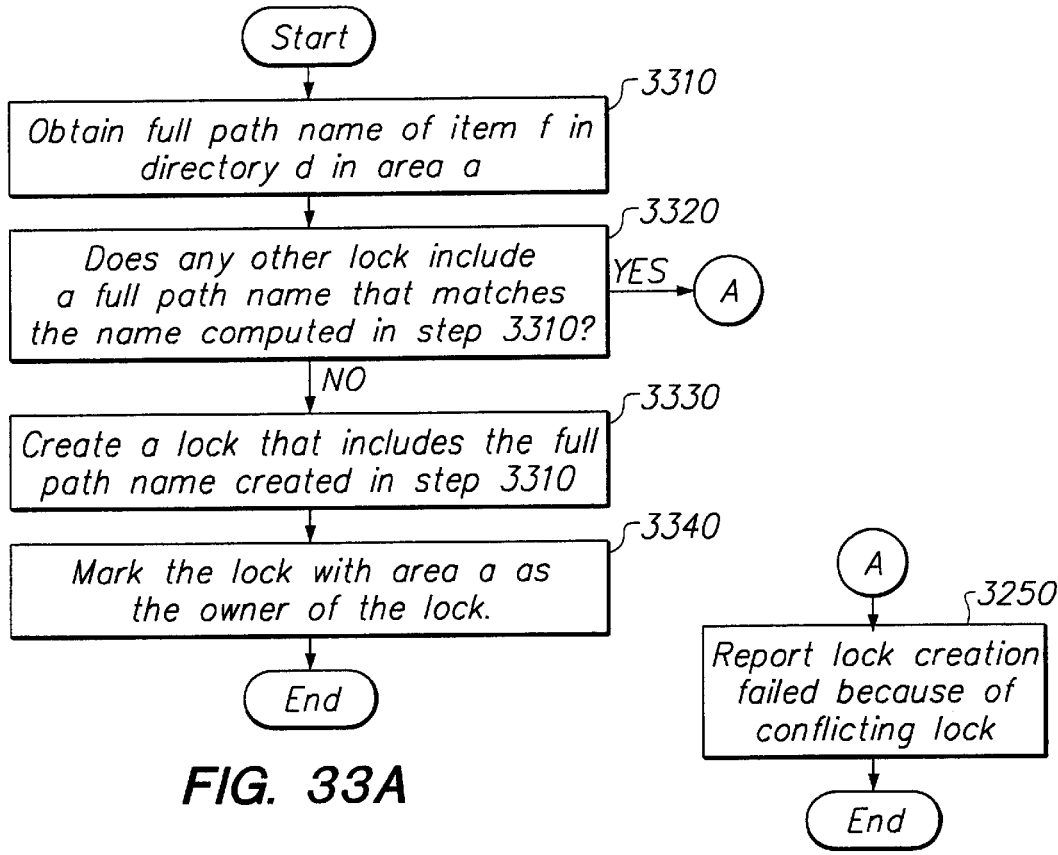
FIG. 33A
FIG. 33B
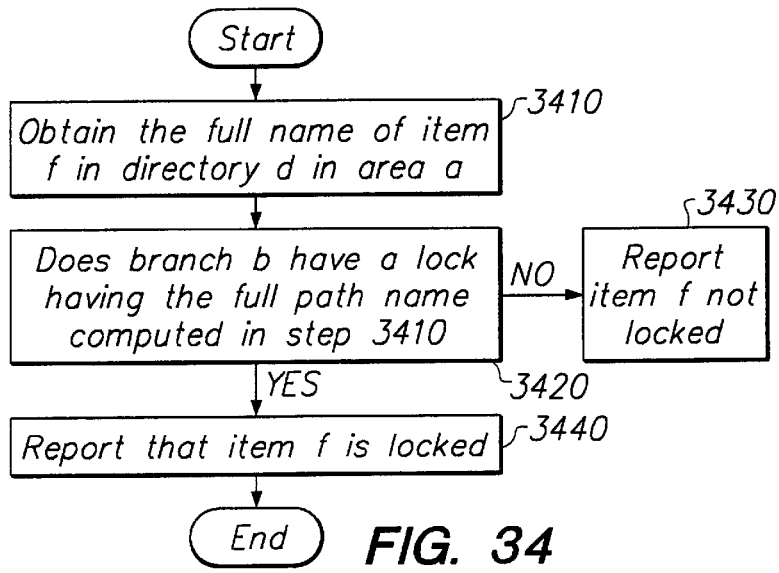
FIG. 34

SYSTEM AND METHOD FOR WEBSITE DEVELOPMENT

RELATED APPLICATIONS

This application is a continuation of U.S. Ser. No. 09/244,333, filed Feb. 1999, and entitled 'System and Method for Website Development'now U.S. Pat. No. 6,505,212.

This application claims the benefit of U.S. Provisional Application No. 60/073,766, filed on Feb. 4, 1998, and titled "System and Method for Website Development," the contents of which are incorporated by reference as if fully disclosed herein.

BACKGROUND OF THE INVENTION

1. Field of the Invention

The present invention relates generally to hierarchical file systems and, more specifically, to a system and method for file management which can be used as a website development tool.

2. Description of the Background Art

The Internet is playing a large role in commerce, and most companies tend to have a website. Many websites need to be frequently modified, and they are usually modified in an ad hoc process by scores of contributors. Consequently, the on-going process of keeping website content up to date, accurate, and well-integrated is often a greater challenge than the initial planning and development phase. Internet sites may be updated by the day, hour, or minute, by teams numbering in the hundreds. Similarly, intranet content contributors constantly submit new content or make changes to existing content, and, unless new content is quickly integrated, the intranet's usefulness as a fundamental communications resources is limited.

Large websites face many problems as the number of web contributors increase exponentially. The volume and content of these sites is increasing rapidly, and sites must be updated more frequently as site traffic and Internet commerce grows. With the increasing number of contributors, volume, and complexity of content, it has becomes increasingly more difficult for the manager of the website ("the webmaster") to oversee every change and perform quality control.

Because of the complexity of website development, there is a need for a central system to manage and control website development. Known systems for managing and controlling website development include software configuration management systems, document management systems, and database publishing systems.

There are several disadvantages associated with such known website development systems. For instance, because maintaining a website often requires the efforts of tens or hundreds of people, it is desirable to have website contributors work in parallel. Software configuration management systems do not allow contributors to simultaneously make changes to the same area of a website. Moreover, none of the known systems allow contributors working in parallel to separately test their own work without actually making a change to the website. Thus, conflicting changes may be posted to a website causing the website to be corrupted.

Since contributors cannot foresee on an individual level the effects of their work when combined with other's contributions, known systems rely on a webmaster to integrate all changes posted to a website and check the changes for errors. A webmaster also ensures that contributors only change content they are authorized to change. However, the webmaster often becomes a bottleneck for the website development process because the webmaster must do all the integration and testing of changes to a website. Integrating the work of multiple users is manual and time consuming, and a great deal of time is wasted on bug fixing and resolving conflicts, while too little time is invested in design, innovation, and strategy. Moreover, a webmaster cannot easily oversee a contributors progress on a change until the contributor is ready to submit the change to the webmaster. Thus, the webmaster cannot correct errors early on and cannot determine how contributors are progressing.

Another disadvantage of known website development systems is that they do not track file version histories. Since website files are continually added, removed, changed, moved, and renamed, it is useful to know who made what version of a file and when the version was made. With full access to prior versions, users can easily find the changes that caused a bug, revert to previous versions, and identify new bugs. Additionally, known website developments systems do not allow immediate access to any previous version of a site subsection or the entire site. The ability to immediately roll back to any previous version of a website can be a vital disaster recovery tool in the event of site corruption or the distribution of inappropriate or inaccurate information.

Therefore, it is desirable to have a web development system that allows contributors to determine how their changes fit into the entire website without actually posting the changes to the website. Additionally, it is desirable to have a web development system that allows contributors to access an earlier version of a file, website subsection, or website and that allows a webmaster to check on the progress of contributors, as well as more easily post changes to a website.

SUMMARY OF THE INVENTION

The present invention provides a system and method for file management. One use of such a system is as a website development tool.

The system of the present invention is comprised of hierarchical file systems, which are referred to herein as "areas." There are three types of areas: work areas, staging areas, and edition areas. A work area is a modifiable file system, and, in a work area a user can create, edit, delete, add, and modify files and directories. In one embodiment, a work area is a virtual copy of an existing website and a user's personal view of the website.

A staging area is a read-only file system that supports select versioning operations. Various users of work areas can integrate their work by submitting the contents of their work areas to the staging area. In the staging area, developers can compare their work and see how their changes fit together.

An edition area is a read-only file system. Contents of a staging area are virtually copied into an edition area to create a frozen, read-only snapshot of the contents of the staging area. In one embodiment the contents of an edition area represent the contents of an edition of a website.

In one embodiment, areas share directory trees so that directories and files do not have to be physically copied each time an area is created. This allows areas to be created quickly and provides for efficient use of system resources. Associated with each file and directory is a history object that stores information on the contents of that file or directory in each area in which that file or directory exists.

In another embodiment, the present invention tracks the history of the contents of each file and directory. This allows the system to easily compare one file with another file or one directory with another directory and identify whether they are identical or related.

In yet another embodiment, the system of the present invention includes an HTTP protocol virtualization module which enables one web server to operate as if it were multiple web servers. This allows each area to be a complete website at the HTTP protocol level without having a separate web server for each area.

BRIEF DESCRIPTION OF THE DRAWINGS

FIG. 8 illustrates an example of a directory tree of an area according to one embodiment of the present invention.

FIG. 9 is a pictorial representation of a work area object according to one embodiment of the present invention.

FIG. 10 illustrates a method for deriving a generation ID according to one embodiment of the present invention.

FIGS. 17a–c illustrate an operation of a branch creation module according to one embodiment of the present invention.

FIGS. 18a–d illustrate an operation of an add item module according to one embodiment of the present invention.

FIG. 20 illustrates an operation of a remove direct reference module according to one embodiment of the present invention.

FIGS. 21a–b illustrate an operation of a reference count module according to one embodiment of the present invention.

FIG. 29 illustrates the operation of a conflict checking module according to one embodiment of the present invention.

FIGS. 30a–b illustrate the operation of a compare directory module according to one embodiment of the present invention.

FIG. 32 illustrates the operation of an area deletion module according to one embodiment of the present invention.

FIGS. 33a–b illustrate an operation of a lock module according to one embodiment of the present invention.

FIG. 34 illustrates another operation of the lock module according to one embodiment of the present invention.

DETAILED DESCRIPTION OF THE PREFERRED EMBODIMENTS

The present invention(s) will be described with respect to website development, but as will be understood by those familiar with the art, the invention(s) may be embodied in other specific forms.

Figure 1:
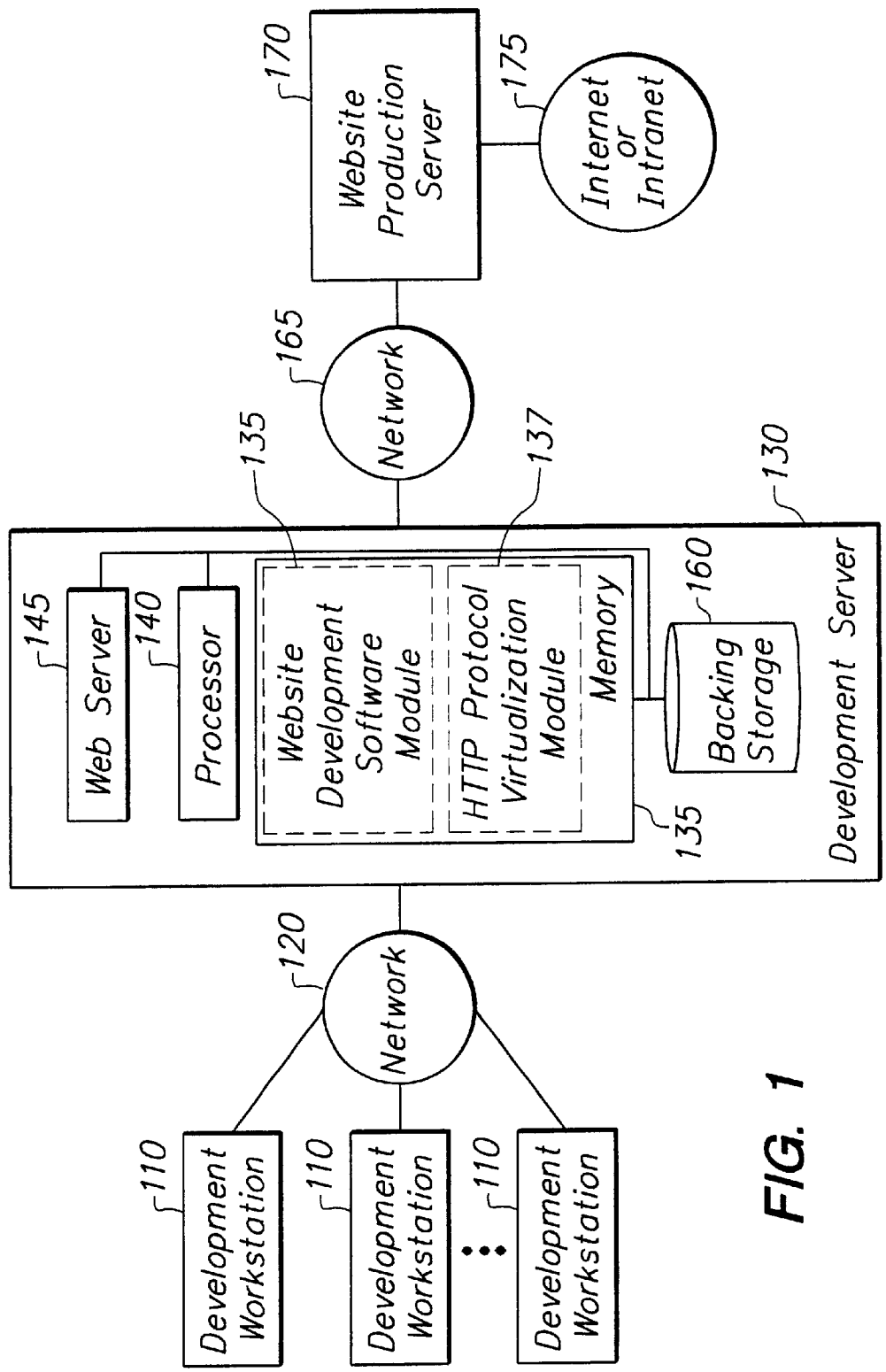
FIG. 1 illustrates a computer network for website development according to one embodiment of the present invention.

FIG. 1 illustrates a computer network 100 for website development. On development workstations 110, which may be conventional personal computers, website developers add, remove, edit, and examine files for a website. The development workstations 110 are connected to a development server 130 via a computer network 120, such as the Internet.

The development server includes a web server 145, which processes HTTP requests from the development stations 110 for website content. The development server 130 also includes a conventional backing storage 160, such as the WINDOWS NT file system commercially available from Microsoft Corporation, in which website files are physically stored.

The development server 130 also includes a conventional memory 150 (e.g., RAM) and a conventional processor 140, which implements the website development methods of the present invention by executing a website development software module 135. The website development module, which is described below, is stored in the memory 150. Also stored in the memory 150 is a HTTP protocol virtualization module 137 which, as discussed below, the processor 140 executes to allow web server 145 to operate as if it were multiple web servers.

The development server 130 is coupled to a production webserver 170 via a network 165. Network 165 may be the same network as network 120 or it may be a different network. The website production web server 170 is coupled to the Internet or an intranet 175, and when a website is ready to be posted on the World Wide Web or on an intranet, the development server 130 sends the website to the production webserver 170, which provides Internet or intranet access to the website.

A website is comprised of the contents of an arbitrary file system. The website development system of the present invention is comprised of a collection of hierarchical file systems. Each of these file systems is an environment that manages individual files and provides means to manipulate them. When executed, the website development software module 135 is the part of the file system that enables most of the management and manipulation of files. The backing storage 160 is where the files and corresponding metadata (e.g., owner identification, group identification, access control file name, modification times, creation times, etc.) are physically stored. In one embodiment, the files can appear to be stored on drives other than the backing storage 160 (even though they are physically stored in the backing storage 160).

A hierarchical file system comprises a tree of directories, populated with files and symbolic links. At the top of the directory tree is a root directory, from which all other directories directly or indirectly stem.

A file system may be modifiable or read-only. A modifiable file system is a file system that supports read operations (e.g., get root directory, read directory, look up directory, read file, get attributes, read symbolic link, and etc.) and modify operations (e.g., create directory, create file, create symbolic link, set attributes, remove file, remove directory, rename file, rename directory, write file, and etc.) on the files. A typical hard drive volume is an example of a modifiable file system.

A read-only file system supports only read operations. Two examples of a read only file system are a CD ROM volume and a floppy disk volume that has the write-tab flipped to the write-protected position.

As stated above, the website development system of the present invention is comprised of hierarchical file systems. Some of the hierarchical files systems are modifiable to enable the creation of the files that make up the content of a website. Others enable files from other files systems to be compared to coordinate the website development, and yet others include the finished files that make up the content of the website.

One way in which the hierarchical files systems of the present invention are distinct from conventional file systems is that, in addition to read and/or modify operations, some of the file systems in the present invention support select versioning operations, which will be discussed below, that enable manipulations of two or more related file systems. The contents of a website are created by performing read, modify, and versioning operations on a collection of related file systems in the present invention.

A hierarchical file system of the present invention is referred to as an "area", and there are three types of areas: work areas, staging areas, and edition areas. A work area is a modifiable file system, whereas staging and edition areas are read-only file systems.

A work area starts out as a virtual copy of an existing website (unless there is no existing website, in which case the work area starts out empty). In other words, a work area starts out having the same contents as the file system designated as the website. A work area is a developer's personal view of a website, and every developer contributing to a website does so in a work area. In a work area, developers can freely add, delete, or modify website content and see how their changes fit into the context of the entire website. Details of add, delete, and modify operations are discussed below. Changes made by a contributor in one work area do not affect the website or the work of other contributors in other work areas. This is because, as stated below, each area is a separate file system.

Developers integrate their work in a staging area by submitting the contents of their work areas into a staging area. The submit operation is one of the select versioning operations referenced above and discussed in more detail below. The staging area is a shared view of the website available to all users on a branch (branches are discussed below). In other words, a staging area is a file system that is accessible to all users along a branch. A staging area holds the collective work of several developers' work areas and allows the developers to share and integrate their changes. In a staging area, the developers can compare their work and see how their changes fit together. The compare operation is another one of the select versioning operations discussed in more detail below.

The collective work in a staging area can be virtually copied back to the private work areas to keep the work areas up-to-date with the current state of the staging areas, which changes as different contributors submit new content from work areas. The copying is "virtual" because areas share directory trees so that the directory trees do not have to be physically copied. When the collective work in a staging area is deemed final, its contents can be published to create an edition of the website. Creating a work area from an edition and publishing a staging area are additional ones of the select versioning operations discussed below.

The contents of a staging area are virtually copied into an edition area to create an edition of a website. Again, virtually copying means that the edition references the same directory tree as the staging area. Because an edition is a read-only file system, it is a frozen snapshot of the content of the entire website at a particular point along a single branch. Each edition is archived and accessible to all developers.

The contents of editions can be virtually copied back into work areas and used as the basis for further development of the website. Editions also serve as archives, allowing users to instantly recall files, entire directories, or reconstruct entire past versions of the website.

Figure 2:
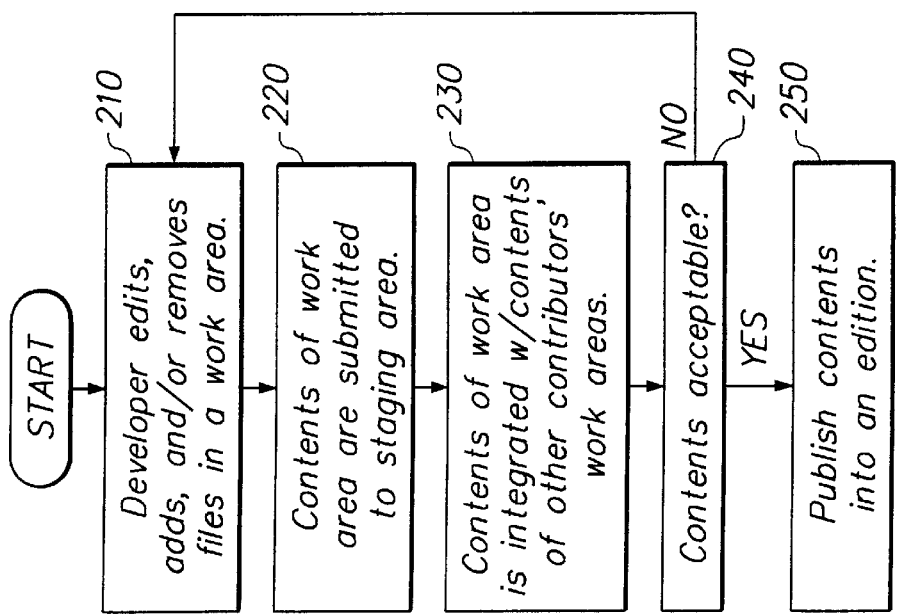
FIG. 2 illustrates the development flow (from the perspective of a developer) for developing website content according to one embodiment of the present invention.

FIG. 2 summarizes the development flow from a work area to an edition from the perspective of a developer. A developer edits, adds, or deletes 210 files in a work area. The developer then submits 220 the contents of his work area to the staging area. In the staging area, the contents of the contributor's work area is integrated 230 with the contents of other contributors' work areas. If all the contents submitted to the staging area integrate well and are approved 240, the contents of the staging area are published 250 into an edition. Otherwise, the contributors continue to edit 210 their files until they are approved.

Figure 3:
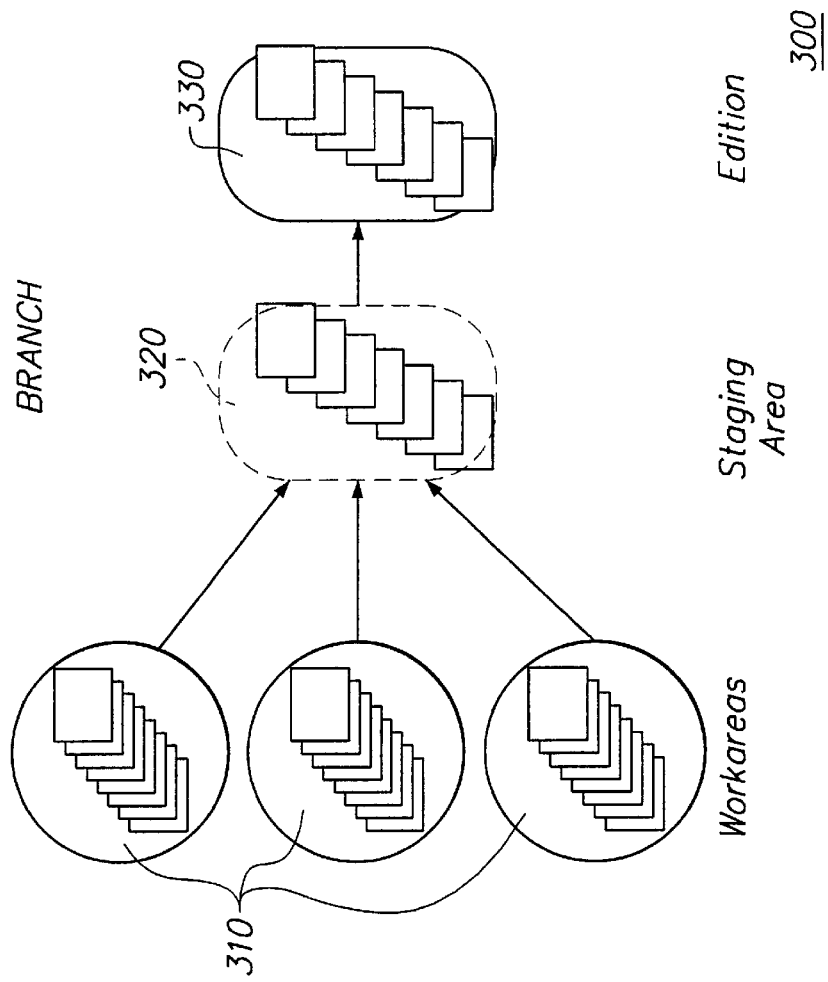
FIG. 3 illustrates an example of a branch according to one embodiment of the present invention.

According to one embodiment, website development can be divided along several branches of development. From a developer's perspective, a branch is a path of development for a single website. As illustrated in FIG. 3, a single branch 300 includes work areas 310, a staging area 320, and one or more archived website editions 330. Branches can include sub-branches, so that development teams may keep alternate paths of development separate from each other. Content can be shared across branches and sub-branches.

An example of dividing website development along branches is to have one branch for the current website and have another branch for a new version of the website. Another example is to have a different branch of development for different regions or for different clients in order to have websites tailored to particular regions or clients.

Figure 4:
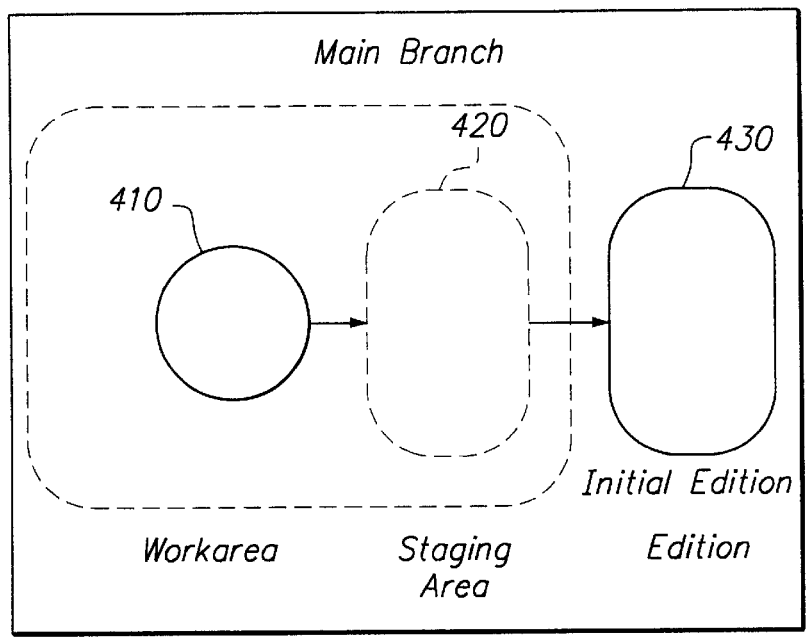
FIG. 4 illustrates an example of the initial contents of a main branch according to one embodiment of the present invention.

A main branch is created when the website development software module is installed on the development server. As illustrated in FIG. 4, a main branch 400 initially include an empty staging area 420 and empty edition 430. A main branch may also initially include an empty work area 410. A work area can be created at the time the main branch is created or at a later time, as a user may desire to delay creating the work area until the user is ready to define the attributes of the work area (e.g., the people that can access the work area).

Figure 5:
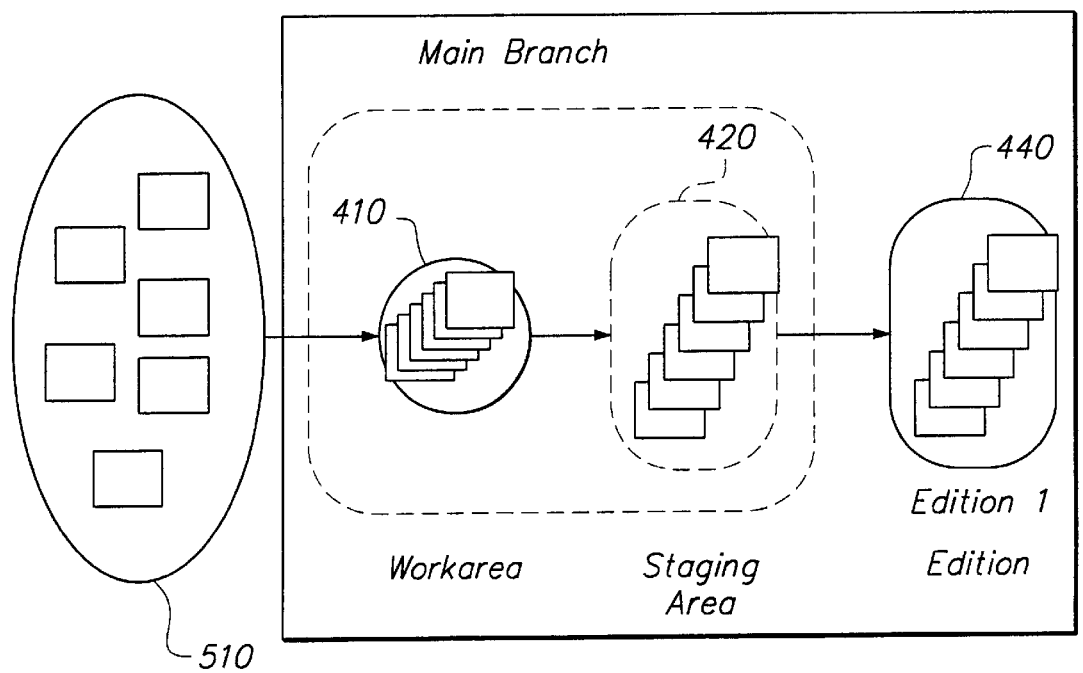
FIG. 5 illustrates an example of a main branch according to one embodiment of the present invention.

If a website existed before the website development software module is installed, then an empty work area 410 is created if it does not already exist. As shown in FIG. 5, the contents 510 of the original website are copied into the empty work area 410, then the empty staging area 420, and then are published into an initial edition 440.

Figure 6:
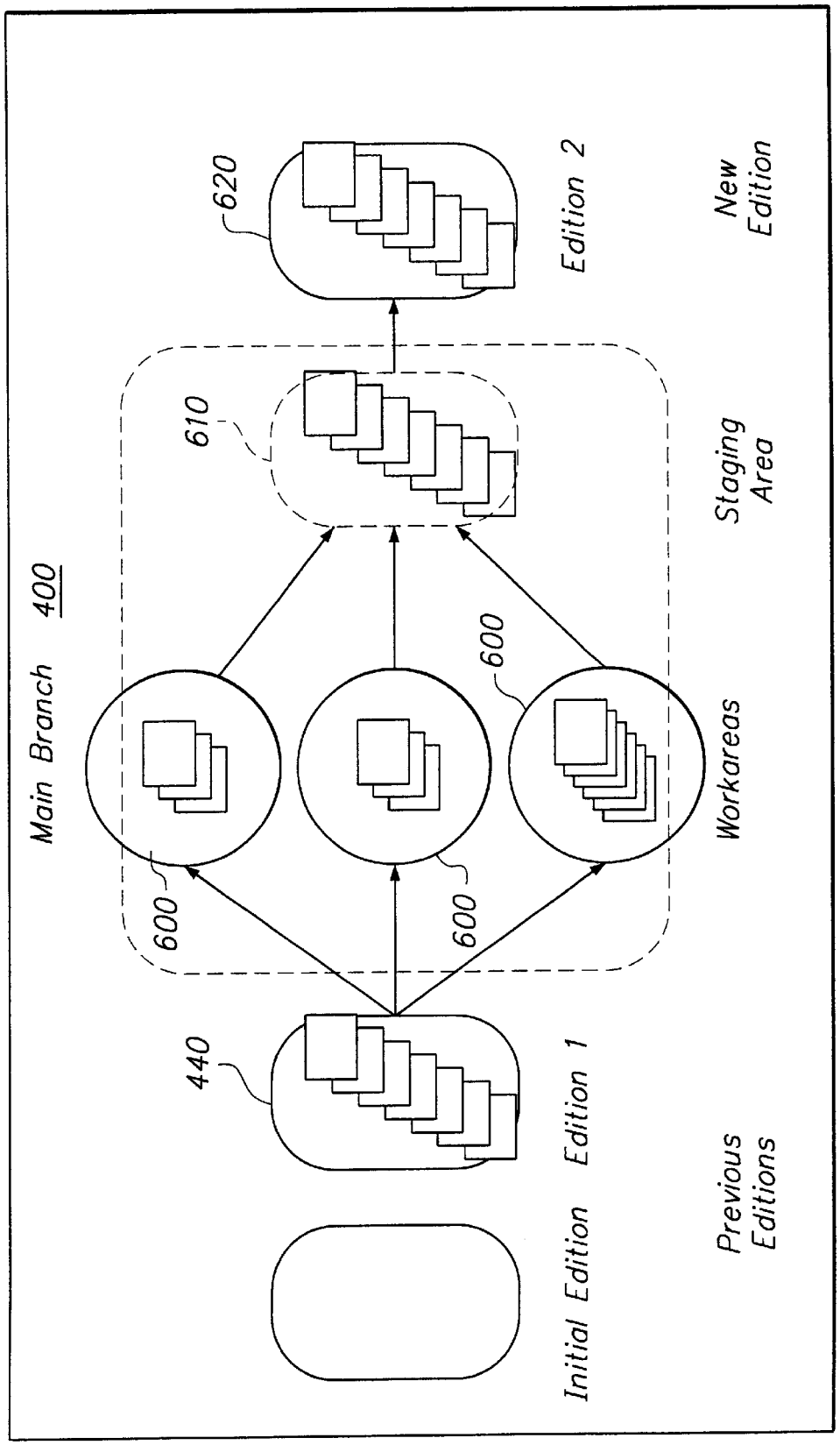
FIG. 6 illustrates another example of a main branch according to one embodiment of the present invention.

Additional work areas can be created off the main branch by virtually copying the contents of the most recent edition into the new work areas. FIG. 6 illustrates the creation of three work areas 600 on the main branch from edition 440. The contents of work areas 600 are submitted to a staging area 610, and the contents of staging area 610 are published into a new edition 620.

Figure 7:
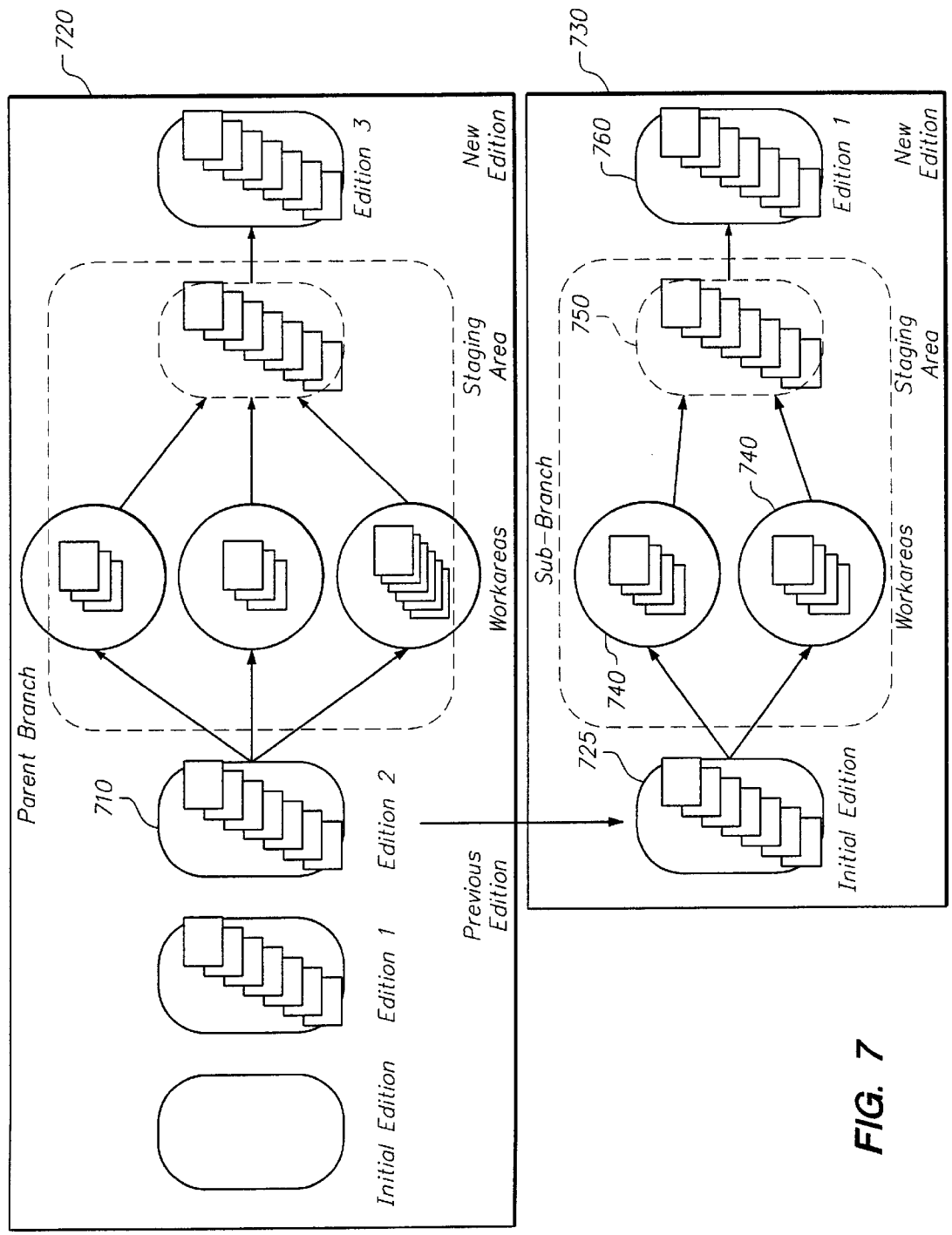
FIG. 7 illustrates an example of a main branch and a sub-branch according to one embodiment of the present invention.

Sub-branches can also be created off a main or other branch. FIG. 7 illustrates the creation of a sub-branch off a main branch. An edition 710 from the parent branch 720 is used as the initial edition 725 for the sub-branch 730. The contents of the initial edition 725 are then virtually copied into work areas 740, staging area 750, and new edition 760 in the sub-branch 730. Note that sub-branches can be created off of other sub-branches in the same manner. Work done on a sub-branch occurs independently from and in parallel to work done on a higher branch.

Work created on a sub-branch can be incorporated into a higher level branch by virtually copying the contents of an edition on the sub-branch back into a work area on the higher branch. Content from the sub-branch will be integrated with the content from other work areas and published as a new edition on the higher branch.

Now that an overview and typical usage of the website development system has been described, the specific implementation of the system, according to one embodiment, will be described.

Each separate work area, staging area, and edition area is comprised of one or more files and directories organized in a tree structure. FIG. 8 illustrates an example of a directory tree for an area, where directory 1 is the root directory. Areas can share the same directory tree. In fact, when an existing area is copied to make a new area, the new area merely references the same root directory as the existing area.

Each separate work area, staging area, and edition area is created by creating an object that represents the area and that has a name field, an object ID field, a generation ID field, a directory field, and a branch field. The name field includes the name of the work area. The directory field identifies the root directory of the directory tree of the particular work area, staging area or edition area. The branch field indicates the branch along which the work area lies. FIG. 9 illustrates a pictorial representation of a work area object. Note that in creating a work area a virtual copy of the directory tree is made, as opposed to a real copy, because the work area object points to the existing directory tree.

Each work area, staging area, and edition area has two unique identifiers, one of which is referred to in this application as a "generation ID," and the other of which is referred to as an "object ID." The object ID identifies the object that represents the area, and, once an object ID is assigned to an object, that object ID is not changed. Each area is also identified by a unique generation ID, which indicates how an area is related to other areas. The generation ID for a particular area can be changed, as will be discussed below (e.g., when a staging area is published into an edition). The generation ID is placed in the generation ID field. The object ID is placed in the object ID field.

Note that directories, files, history objects (discussed below), and other objects are also assigned object IDs which remain unchanged once assigned.

A generation ID is comprised of a unique sequence or set of numbers. A generation ID not only uniquely identifies an area, but, as stated above, also indicates how an area is related to other areas.

An area is related to another area if one of the areas is derived, directly or indirectly, from the other area. For example, in FIG. 7 the initial edition in the sub-branch is directly derived from edition 2 in the parent branch. The work areas in the sub-branch are directly derived from the initial edition in the sub-branch and indirectly derived from edition 2 in the parent branch.

A generation ID includes a number unique to it and the numbers of the generation IDs from which the generation ID is derived. For instance, if the number 1 is the unique number assigned to one area and if the number 0 is the unique number assigned to another area, then the generation ID of an area derived from these areas is its own unique number, say 4, as well as the numbers 0 and 1.

FIG. 10 illustrates the method for deriving a generation ID, which is to be assigned to a new area, from a parent generation ID, where the parent generation ID is assigned to the direct parent of the new area. A unique number is obtained 1000 using a conventional algorithm for sequentially (e.g., 1, 2, 3, 4) or randomly generating unique numbers. The set or sequence of unique numbers associated with the parent generation ID is then retrieved 1010. Subsequently, a set or sequence of numbers that is the concatenation of the parent generation ID and the just issued unique number is created 1020.

The relationship between the areas is also represented by a genealogy tree. A genealogy tree is a data structure, where each node of the tree represents a different generation (i.e., area. Note that throughout this application areas are often referred to as generations).

Figure 11:
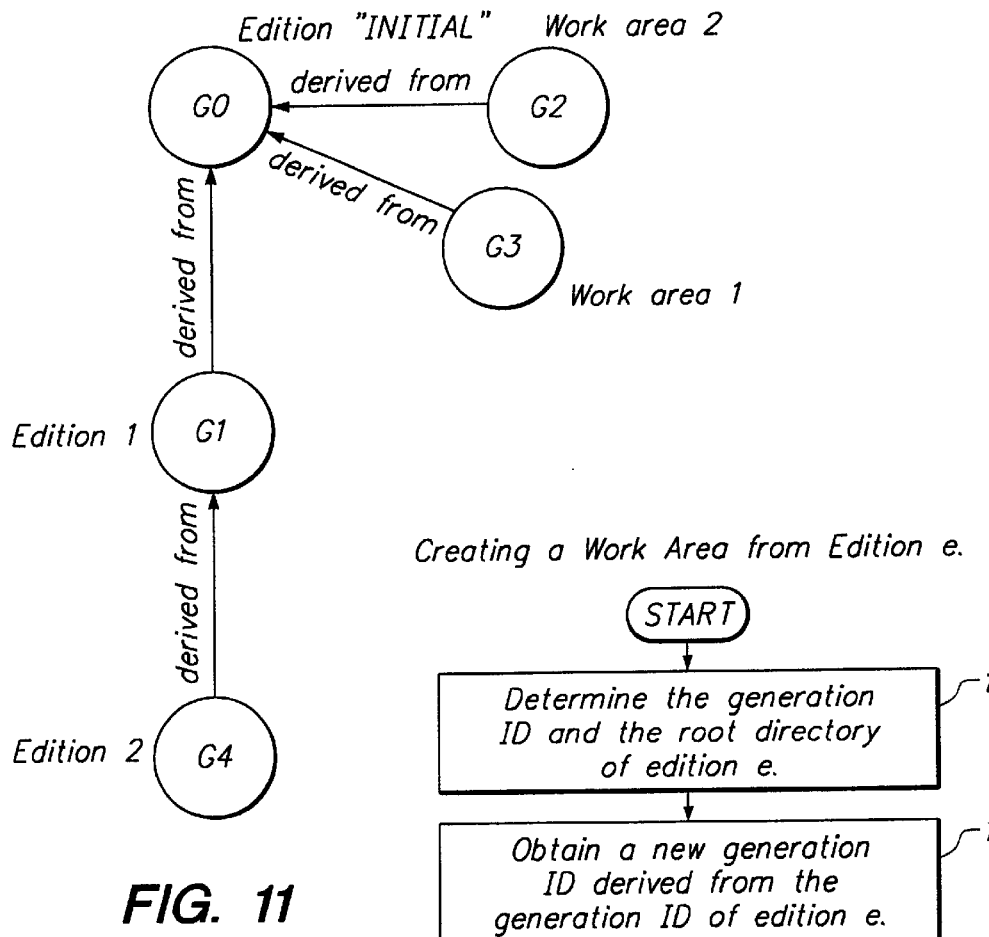
FIG. 11 illustrates an example of a genealogy tree according to one embodiment of the present invention.

FIG. 11 illustrates an example of a genealogy tree. The generation G0 represents the initial edition. Generation G2 represents one work area ("work area 1"), generation G3 represents another work area ("work area 2"), generation G1 represents an edition ("edition 1"), and generation G4 represents a staging area. The genealogy tree illustrates that G1, G2, G3 are directly derived from G0, which means that G1, G2, and G3 have the same root directory as G0. G4 is indirectly derived from G0 and directly derived from G1 and, therefore, also has the same root directory as G0.

Figure 12:
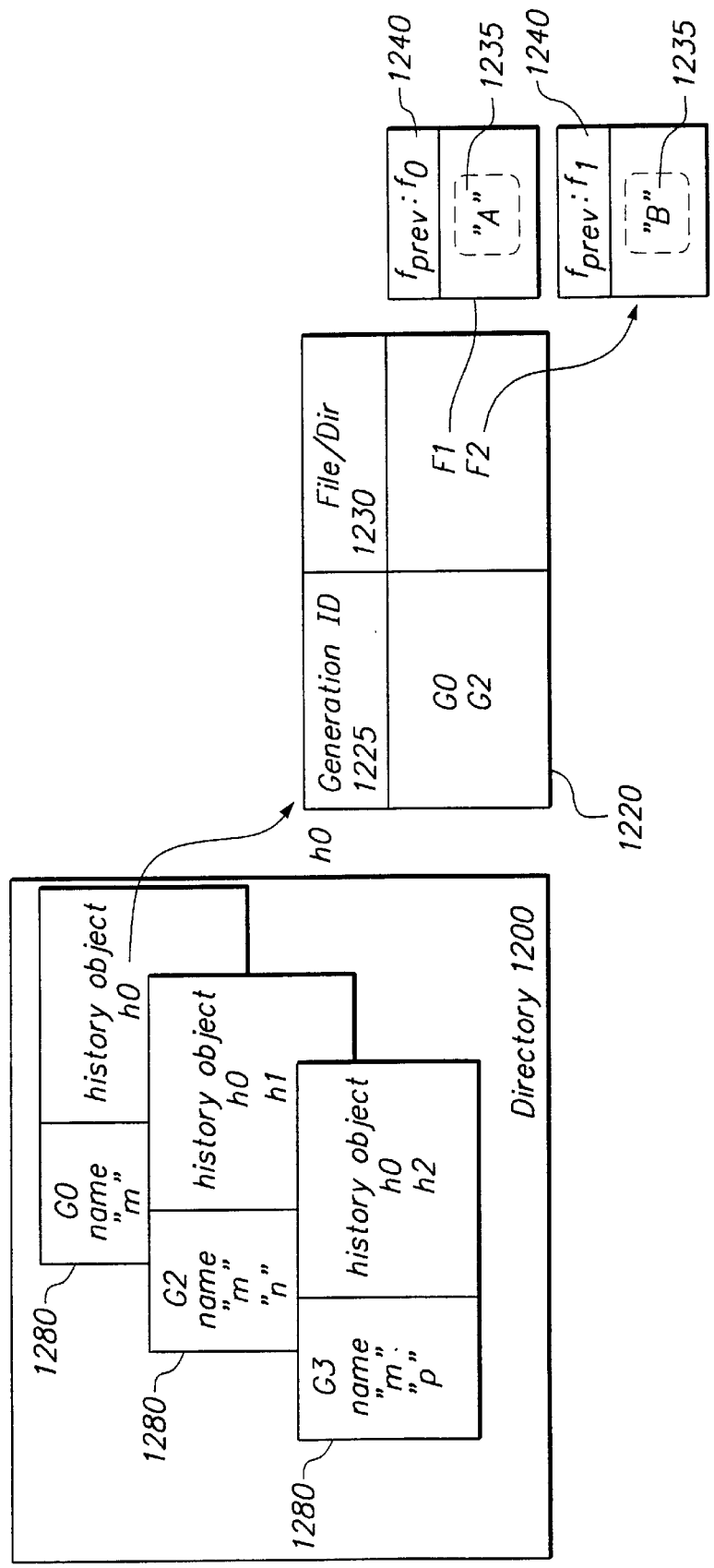
FIG. 12 is a pictorial representation of a directory according to one embodiment of the present invention.

FIG. 12 illustrates a pictorial representation of a directory 1200. For each generation in which the directory has been altered, the directory includes a generation page 1280, which is an object that lists the contents of the directory in the generation corresponding to the generation page 1280. Thus, a directory effectively includes a snapshot of the contents of the directory at each generation in which the directory has been altered. Generation pages 1280 allow different areas to reference the same directory, even though the directory may have different contents in different areas.

In the directory 1200 illustrated in FIG. 12, the directory pages 1280 indicate that item "m" was added to the directory 1200 in generation G0, that item "n" was added to the directory 1200 in generation G2, and that "p" was added to the directory 1200 in generation G3. Note that, assuming nothing has been removed from the directory 1200, the directory pages 1280 include not only the contents that were added in a particular generation, but also the contents that were added in the generations from which the particular generation was derived. For instance, assume that the genealogy tree illustrated in FIG. 10 applies to this example. In generation G0, directory d1 contains item "m." In generation G2, item "n" is added to directory 1200, and, therefore, since G2 was derived from G0, directory 1200 contains items "m" and "n" in generation G2 (assuming "m" was not removed). In generation G3, item "p" is added to directory d1, and, therefore directory 1200 includes the items "p" and "m." Note that G3 was not derived from G2, and, consequently, directory 1200 does not include item "n" in generation G3.

In one embodiment, if a directory has not been altered in a particular generation, the directory will not include a generation page for that generation. Once a directory is altered in a generation, a generation page for the generation is added to the directory.

Each item in a directory is associated with a history object. A history object indicates the generation in which the contents of a file or directory were edited or modified. In other words, a history object indicates the history of an item in a directory. A history object includes a field 1225 for a generation ID and a contents field 1230 for a pointer to a file or a directory. In the example illustrated in FIG. 12, history object h0 indicates that in generation g0, item n contains the contents associated with file f1. History object h0 also indicates that in generation G2 item n contains the contents associated with file f2 (and not file f1). The items listed in the contents field 1230 point to the actual contents 1235 of file f2. If f2 were a directory, it would point to another directory like directory 1200. The contents include a "previous field" 1240 that has a pointer to the preceding file or directory associated with the item listed in the directory. For instance, f2 points to a file having contents, "B," as well as a pointer 1240 to f1, meaning that prior to generation G2, item "m" had the contents of f1.

Figure 13:
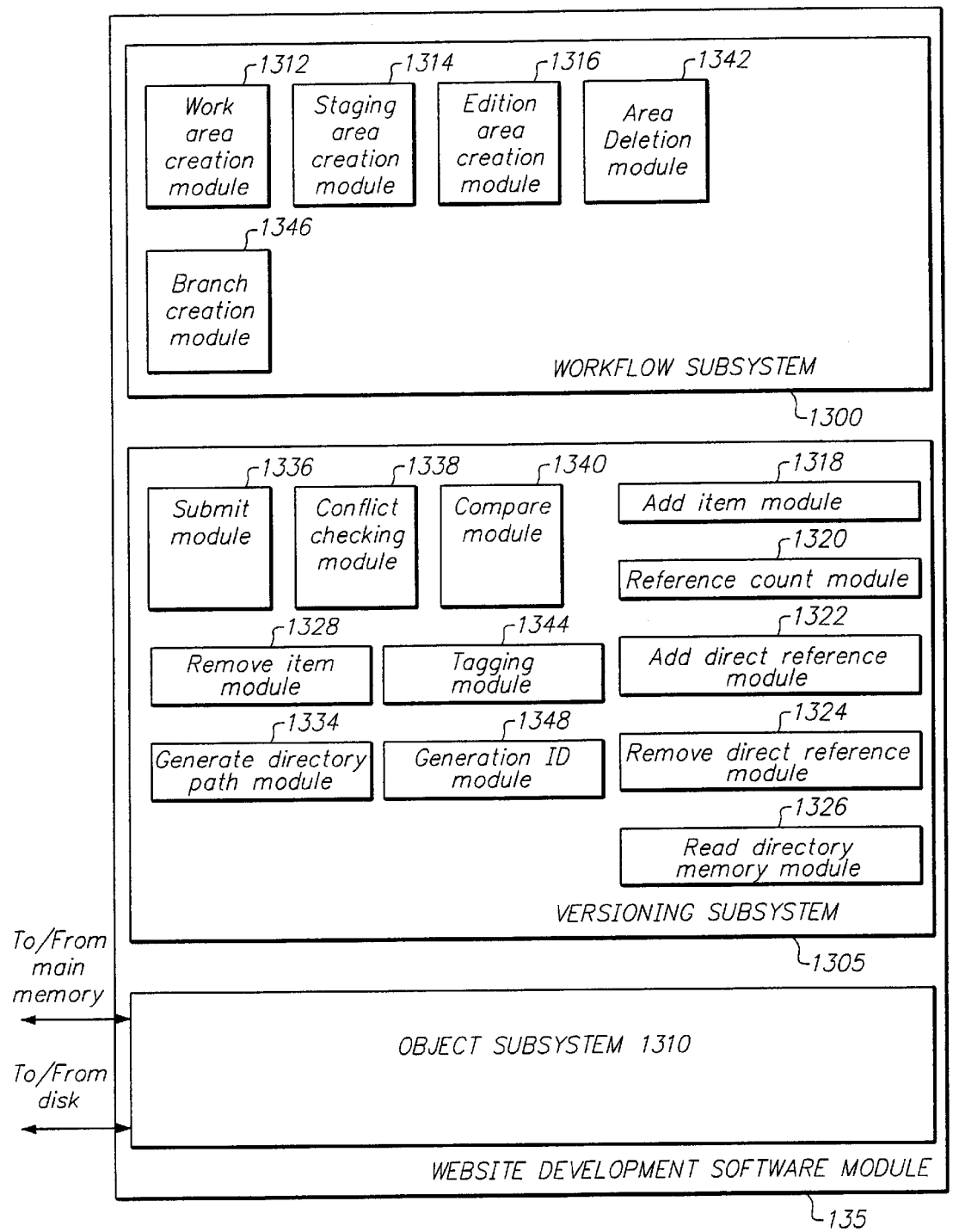
FIG. 13 illustrates a website development module according to one embodiment of the present invention.

FIG. 13 illustrates the website development software module 135 according to one embodiment of the present invention, which enables the creation and manipulation of the work, staging, and edition areas. The website development software module 135 includes a workflow subsystem 1300, a versioning subsystem 1305, and an object subsystem 1310. The workflow subsystem creates and manages work areas, staging areas, edition areas, and branches. The versioning subsystem manages and controls functions such as modifying and editing files and directories, comparing files, comparing directories, submitting the contents of a work area to a staging area, and checking files and directories for conflict. The object subsystem manages the distribution of objects in the main memory of the server and in the disk. The object subsystem may be implemented as a conventional persistent object storing and caching subsystem.

The work flow subsystem includes a work area creation module 1312, a staging area creation 1314 module, an edition area creation module 1316, a branch creation module 1346, and an area deletion module 1342. The versioning subsystem 130 includes a submit module 1336, a conflicts checking module 1338, a compare module 1340, an add item module 1318, reference count module 1320, add direct reference module 1322, remove direct reference module 1324, read directory module 1326, remove item module 1328, edit file module 1330, rename module 1332, generate directory path module 1334, locking module 1344, generation ID module 1348. These modules in the workflow subsystem and the versioning subsystem enable the creation and manipulation of areas, files, directories, and other objects used to develop a website.

The workflow and versioning subsystems are implemented in the C++ programming language. The operation of the modules in the workflow subsystem and the versioning subsystem are described below.

Figure 14:
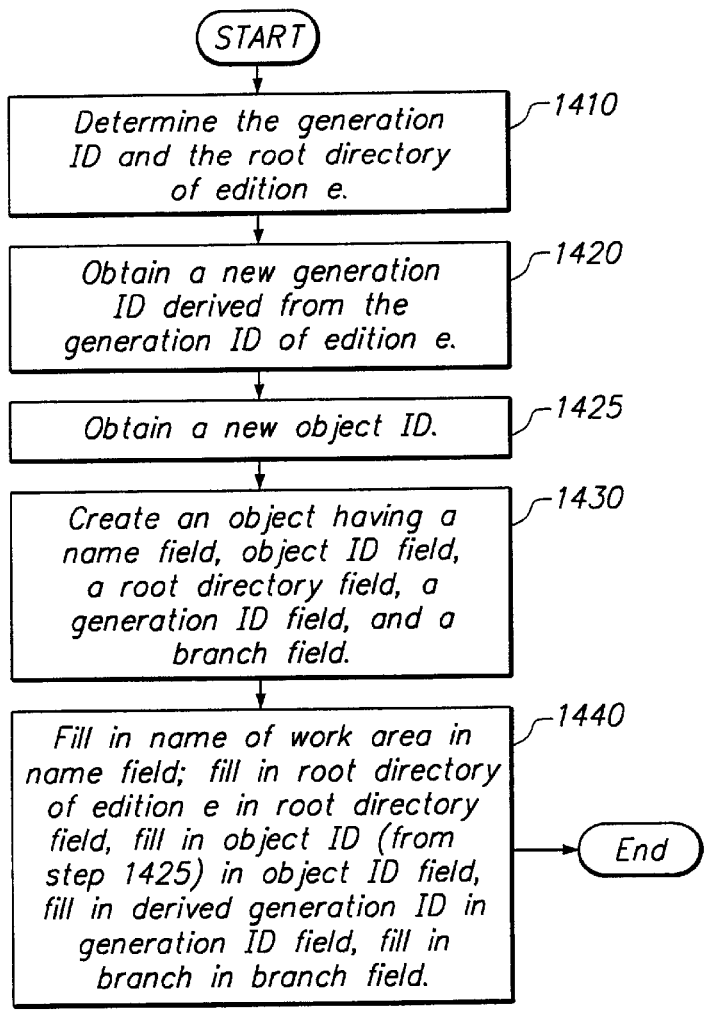
FIG. 14 illustrates an operation of a work area creation module according to one embodiment of the present invention.

As discussed above, a work area is created by virtually copying the contents of a previous edition into the work area (with the exception of the first work area on the main branch which is initially empty). FIG. 14 illustrates the operation of work area creation module 1312 for creating a work area from an edition, which will be arbitrarily named "edition e." The module 1312 obtains 1410 the root directory and the generation ID of edition e. The module 1312 then obtains 1420 from the generation ID module 1348 a new generation ID, which is derived from the generation ID of edition e. The generation ID module 1348 derives the new generation ID by performing the process illustrated in FIG. 11. The module 1312 also obtains a new object ID (which is a unique, randomly or sequentially generated number) for the work area.

The module 1312 creates 1430 an object representing the work area and having a name field, a root directory field, an object ID field, a generation ID field, and a branch field. The module fills 1440 in the name of the work area in the name field, the root directory of edition e in the directory field, the generation ID derived in step 1420 in the generation ID field, the object ID in the object ID field, and the identification of the branch along which the work area lies in the branch field. Thus, the object indicates that the work area is a data structure having the same root directory of edition e and having the derived generation ID. Note that the contents of edition e were not physically copied to create the work area. Rather, an object was created indicating that the newly created work area initially has the same data structure as edition e.

Figure 15:
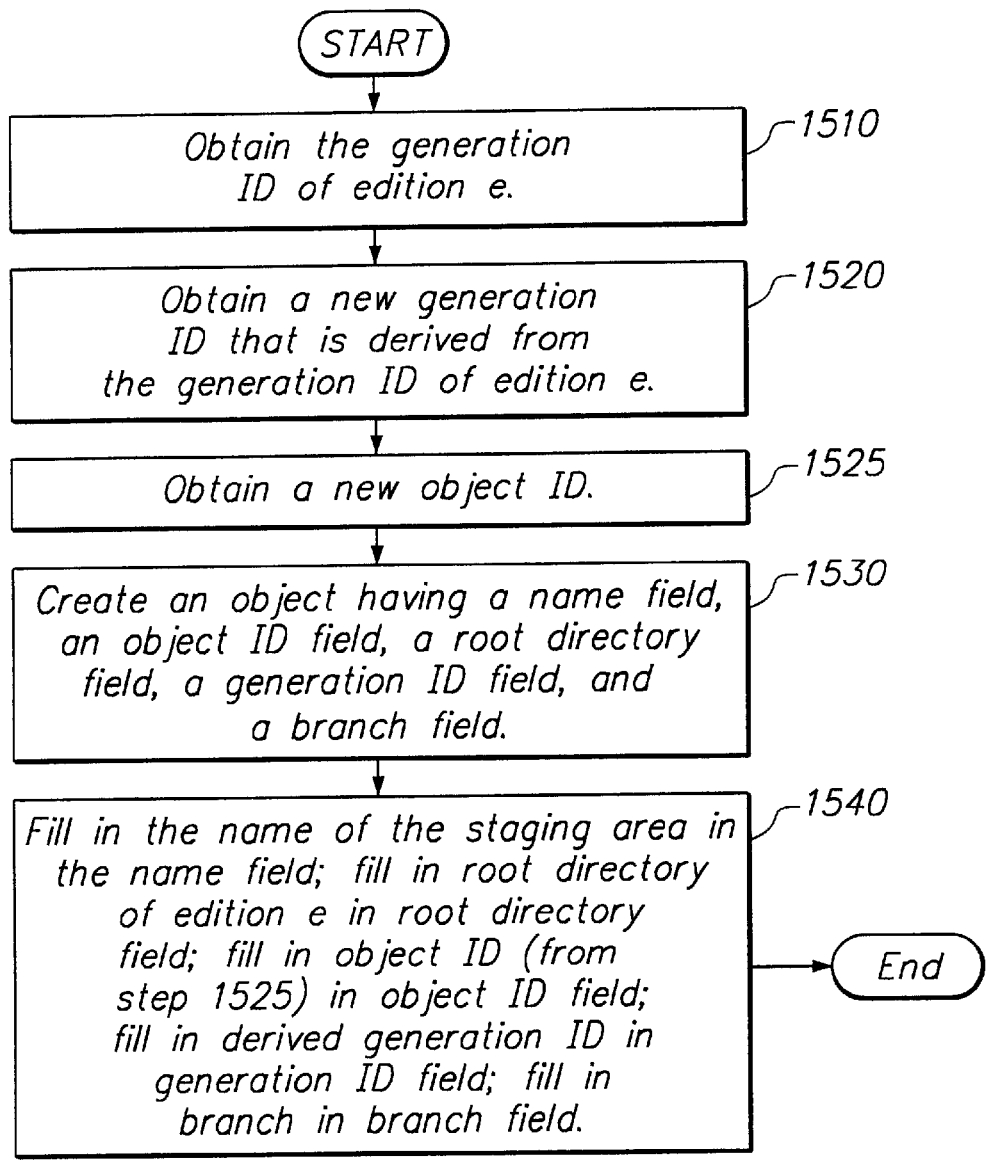
FIG. 15 illustrates an operation of a staging area creation module according to one embodiment of the present invention.

FIG. 15 illustrates the operation of the staging area creation module 1314 for creating a staging area from an edition, which will be referred to as edition e. To create a staging area, the module 1314 obtains 1510 the generation ID of edition e and then obtains 1520 from the generation ID module 1348 a new generation ID derived from the generation ID of edition e. The module 1314 also obtains a new object ID (a unique, randomly or sequentially generated number) for the staging area.

The module 1314 creates 1530 an object that represents the staging area and that has a name field, a root directory field, a generation ID field, an object ID field, and a branch field. The module 1314 fills 1540 in the name of the staging area in the name field, the root directory of edition e in the root directory field, the generation ID obtained in step 1520 in the generation ID field, the object ID obtained in step 1525 in the object ID field, and the identification of the branch along which the staging area lies in the branch field.

It is sometimes desirable to have multiple staging areas. For instance, in addition to a public staging area it may be desirable to have a few private staging areas to which only select users can submit content. Multiple staging areas can be created by performing the above-described staging area creation method multiple times.

Figure 16A:
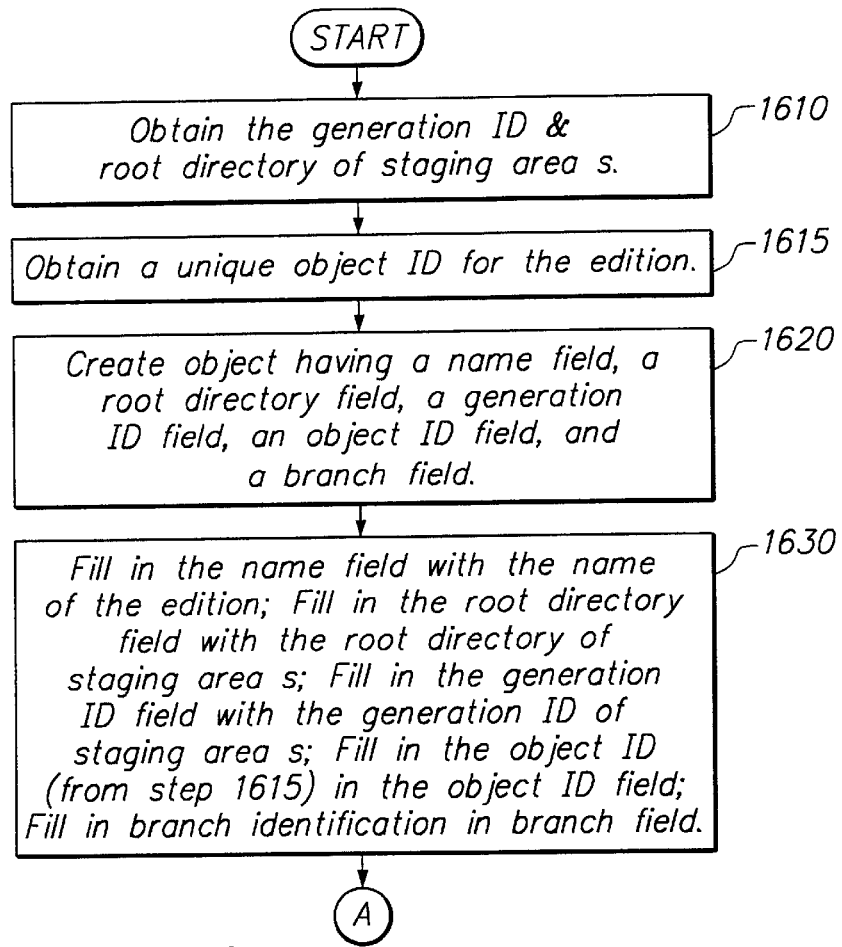
FIGS. 16a–b illustrate an operation of an edition creation module according to one embodiment of the present invention.
Figure 16B:
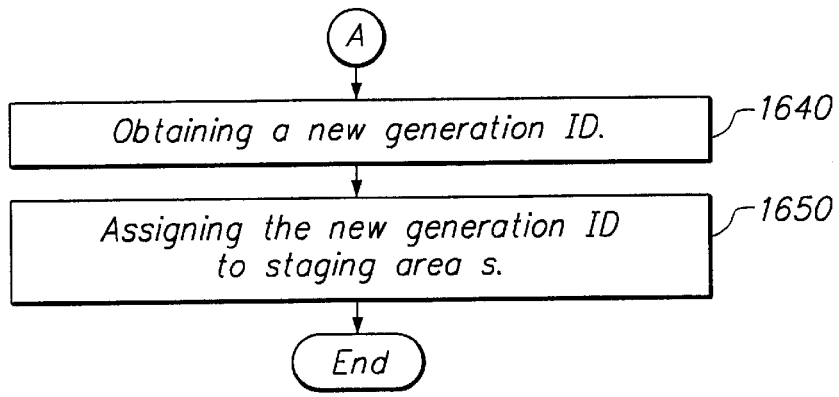

FIGS. 16*a*–*b* illustrate the operation of the edition creation module 1316 for creating an edition from the contents of a staging area, arbitrarily labeled "s." The module 1316 obtains 1610 the generation ID and the root directory of staging area s. The module also obtains 1615 a unique object ID for edition e. The module 1316 creates 1620 an object that represents the new edition and that has a name field, a root directory field, a generation ID field, an object ID field, and a branch field. The module 1316 fills 1630 in the name field with the name of the new edition, the generation ID field with the generation ID of staging area s, the root directory field with the root directory of staging area s, the object ID field with the object ID obtained in step 1625, and the branch field with the identification of the branch along which the edition lies.

By taking the generation ID of the staging area, module 1316 essentially converts staging area s into the new edition. Consequently, when the edition is created, the edition creation module 1316 obtains 1640 a new generation ID and assigns 1650 it to the staging area.

FIGS. 17*a*–17*c* illustrate the operation of the branch creation module 1346. To create a branch, the module 1346 determines 1705 whether the branch being created is a main branch. If the branch is not a main branch, the module 1346 obtains 1710 the generation ID of the base edition, call it "edition b," from the parent branch from which the new branch stems. Edition "b" can be any edition on the parent branch. The module 1346 then obtains 1715 from generation ID module 1348 a new generation ID derived from the generation ID of edition b. An initial edition, call it "edition e," is then created 1720 with the same root directory as edition b and with the generation ID obtained in step 1715. Additionally, zero or more work areas may be created 1730, each having the same root directory as edition e and a different generation ID derived from the generation ID of edition e. The work areas may be created at the time of branch creation or at a later time. A staging area is created 1740 having the same root directory as edition e and having a generation ID derived from the generation ID of edition e. Edition e, the work areas, and the staging areas are created in accordance with the methods discussed with respect to FIGS. 14–16.

Referring back to step 1705, if the branch being created is a main branch, the module 1346 obtains 1750 a root generation ID, call it g0. A root generation ID is a number generated using a conventional program for generating unique numbers, and it is not derived from another generation ID. The module 1346 then creates 1755, 1760 an empty directory, call it d0, and a history object, call it h0, for the directory. The module 1346 adds 1765 an entry to the history object indicating that the history object is associated with directory d0 in generation g0. This entry can be represented by the notation (g0,d0).

After creating the history object, the module 1346 creates 1770 an initial edition having root directory d0 and root generation g0. The module also creates 1775 a staging area and one or more work areas, each having the same root directory as the initial edition (i.e., empty) and a different generation ID derived from the root generation. Note that the work areas do not have to be created at the time of branch creation; they may be created at a later time.

The add item module 1318 enables the addition of objects, such as files and directories, to a work area or a staging area. FIGS. 18*a*–*d* illustrate the operation of the add item module 1318 for adding an item "n" having the contents "f" to a directory "d" in an area "a." Area a can be a work area or a staging area, and item n can be a file or a directory. Item f can also be a file or a directory. To add the item, the module 1318 identifies 1805 the generation ID for area a, call it "g." The module 1318 then reads 1810 directory d and determines 1815 whether there is a generation page for generation g. If there is not a generation page for directory d, the module 1318 creates 1820 a generation page for directory d by copying the generation page of the most closely related parent generation ("best match generation") that has a generation page. After either finding a generation page for generation g or creating it, the module 1318 scans 1825 the contents of the generation page for an item with the name "n," to determine 1835 whether item n exists in directory d in generation g. If an item named "n" is not found in directory d in generation g, the module 1318 creates 1840 a history object with an entry in the history object indicating that contents "f" are associated with item n in generation g. The notation (f,g) will be used to represent such an entry. The module 1318 subsequently adds 1845 an entry, represented by the notation (n,h), to the generation page "g," indicating that file "n" is associated with history object "h." Note that to add item n to directory d, item n is neither virtually copied nor physically copied into directory d. Directory d merely references item n.

The answer to the question in step 1835 will be affirmative when item n has already been added to the directory, but an updated version of item n is replacing the existing version (i.e. new contents are now being associated with item n). If this is the case, the module 1318 will scan 1850 the contents of the history object associated with file "n" for the most recent generation in which item "n" was altered. The module 1318 then determines 1855 if item n was altered in generation g (i.e., the module 1318 determines if item n was altered in area a because area a has generation ID g). If item n was not altered in generation g, then the module 1318 adds 1860 an entry to the history object indicating that content f was associated with file n in generation g. Item f has a field that indicates the previous contents of item n (e.g., item f includes a pointer to the previous contents of item n). The module 1318 sets 1865 the previous field of item f to point to the contents of "n" in the best match generation.

Referring to step 1855, if item n was altered in generation g, then module 1318 alters 1870 the history item entry associated with generation g to reflect that, in generation g, the content of item n is item f. Then the module 1318 sets 1875 the previous field of item f to point to the previous contents of n in generation g.

To reclaim resources, an object (e.g. a directory, a file, a history object) is physically deleted from storage if it cannot be accessed from any area. Adding and deleting an object from an area can be virtual because often only one physical copy of the object is stored. Therefore, in order to determine whether the physical copy of an object should be deleted, it is necessary to know whether the object can be accessed from any one area. If an object can be accessed from an area, it is "referenced" in that area. To determine whether an object can be accessed from any one area, a reference count is maintained for each object, where the reference count indicates the number of areas from which an object can be accessed. An object can be deleted if the reference count for the object is zero.

To enable the calculation of a reference count, each object is associated with a "reference list" and an "anti-reference list." A reference lists indicates the directories to which an object was added and, for each referenced directory, the generation (i.e., area) in which the object was added to the directory. Specifically, each time an object is added to a directory, an entry is added to the reference list indicating the generation in which the object was added to the directory.

An anti-reference list indicates the directories from which the object was removed and, for each referenced directory, the generation in which the object was removed from the directory. Specifically, each time an object is removed from a directory, an entry is added to the anti-reference list indicating the directory and the generation in which the object was removed from the directory.

Figure 19:
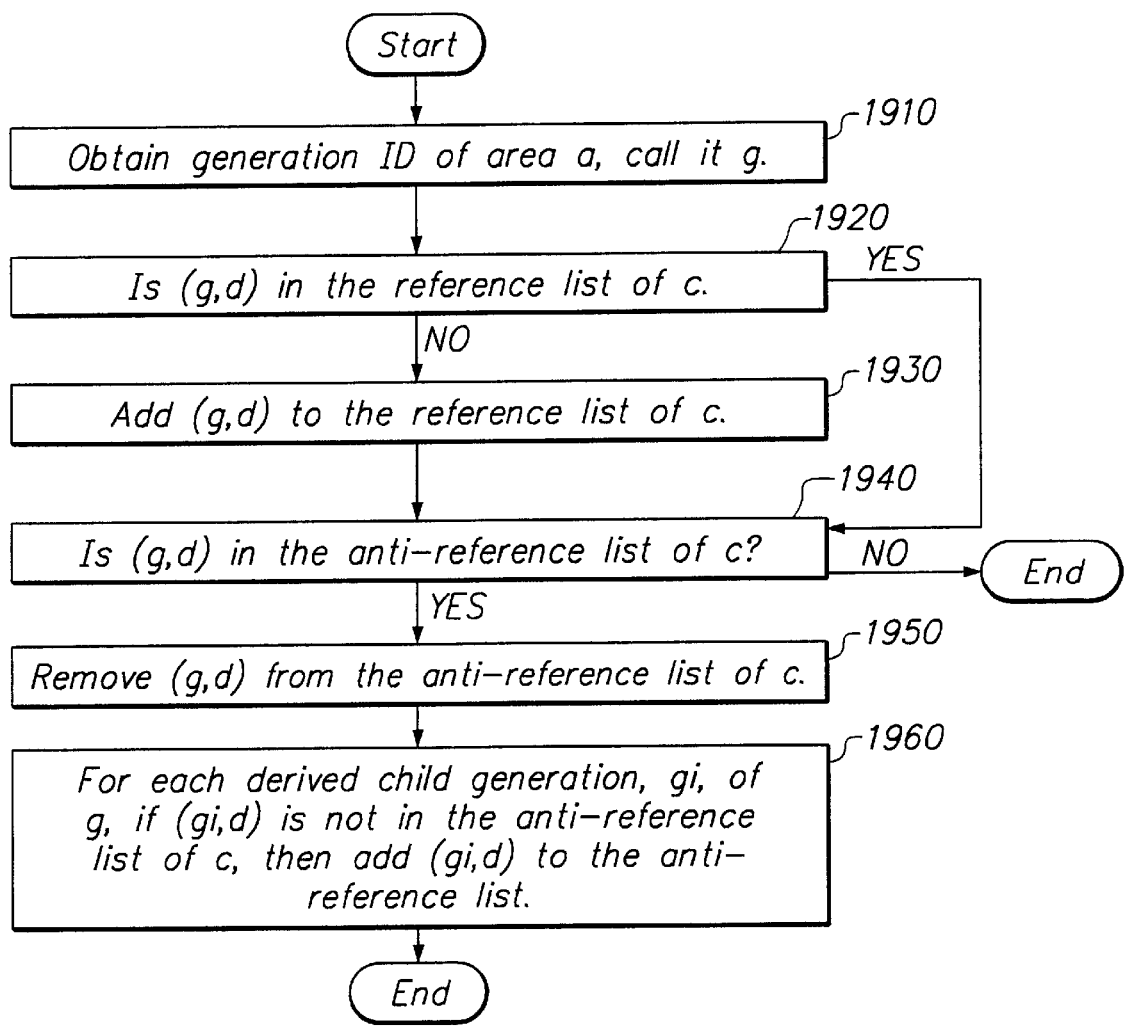
FIG. 19 illustrates an operation of an add direct reference module according to one embodiment of the present invention.

The add direct reference module 1322 adds entries to reference lists. FIG. 19 illustrates the operation of the add direct reference module 1322 when an object (e.g., a file, or a directory, or a history object) is added to a directory "d" in area "a." When object c is added to directory d, a direct reference of d to c is added. In other words, the reference list of c indicated that c was added to directory d. To add a direct reference, the add direct reference module 1322 first obtains 1910 the generation of area a, which will be called "g" for convenience. The add direct reference module 1322 then determines 1920 whether there is an entry in the reference list of object c that indicates that object c was added to directory d in generation g. For convenience, such an entry is represented by the notation (g,d). If (g,d) is not in the reference list of object c, then the entry is added 1930 to the reference list.

After (g,d) is added to the reference list, or if (g,d) was already in the reference list, the add direct reference module 1322 determines 1940 whether the entry (g,d) is in the anti-reference list. The entry (g,d) would be in the anti-reference list if the object c was previously removed from directory p in generation g. If the entry (g,d) is not in the anti-reference list of object c, then the process of adding a direct reference is complete. If the entry (g,d) is in the anti-reference list, the entry is removed 1950 from the anti-reference list. Additionally, for each generation, call it $g_i$, directly derived from generation g, the entry $(g_i,d)$ is added 1960 to the antireference list. The reason for this last step is that a derived generation starts out with the same contents as its parent generation. Therefore, if an object can be accessed in one generation, it can be accessed from all child generations derived from that generation, unless the object was added to the parent directory after the derivation of the child generations or unless the object has been specifically removed from the child generations. Consequently, if an object is added to a directory in a generation having existing child generations, the anti-reference list must indicate that the object cannot be accessed from the existing child generations because the object was not part of the parent generation at the time the existing child generations were derived. Of course, the object can also be added to the child generations using the method illustrated in and described with respect to FIGS. 18a–d.

The remove direct reference module 1324 adds entries to the anti-reference list. FIG. 20 illustrates the operation of the remove direct reference module 1324 when an object "c" is removed from a directory "d" in an area "a". The remove direct reference module 1324 ascertains 2010 the generation ID of area a, which will be called "g" for convenience. The remove direct reference module 1324 then determines 2020 whether there is an entry in the reference list of object that indicates that object c was previously added to directory d in generation g. Such an entry will be represented by the notation (g,d). If (g,d) is not in the reference list, then the process is complete because object c never had a direct reference to directory d in generation g. Therefore, no reference need be removed.

If (g,d) is in the reference list, it is removed 2030 from the reference list of object c. Additionally, for each child generation, call it $g_i$, derived from g, if the entry $(g_i, d)$ is not in the anti-reference list, the entry is added 2040 to the reference list. The reason for this step is so that the reference list indicates that, if object c was accessible from existing child generations, it is still accessible from existing child generations, despite the fact it has been removed from a parent generation.

After step 2040, the remove direct reference module 1324 determines 2050 whether the entry (g,d) is in the anti-reference list. If the entry is not already in the anti-reference list, it is added 2060 to the anti-reference list. Otherwise, the process of removing a direct reference is complete. Although the entry (g,d) should not already be in the anti-reference list, the remove direct reference module 1324 makes this determination in case the entry was erroneously added to the anti-reference list at an earlier time.

The reference count module 1320 calculates the number of references to an item. To do so, the reference count module 1320 maintains list p of two tuples, which is initially empty. The reference count module 1320 also uses an integer n, which is initially set to zero, to represent the number of references made to item f.

Figure 21B:
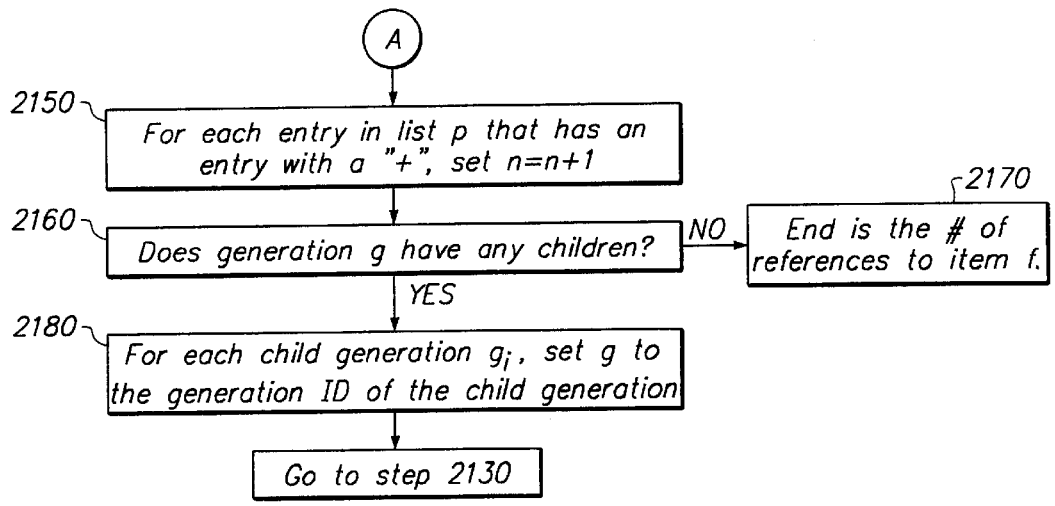

FIGS. 21a–b illustrate the operation of the reference count module 1320 for calculating the reference count of an item f. The reference count module 1320 retrieves 2110, 2120 the reference and anti-reference lists for item f. The reference count module obtains 2525 the generation ID, which will be called "g" for convenience, of the root node of the genealogy tree (recall that all the areas in the present invention can by organized into a genealogy). The reference count module 1320 finds 2130 all entries in the reference list with generation g. For instance, if item f was added to directory d1 in generation g, there would be entry (g, d1) in the reference list, and the reference count module 1320 would locate this entry. For each of the entries with generation g, the reference count module 1320 adds 2130 an entry (item name, +) to list p, where "item name" is the name of the item referenced in generation g. The "+" means the item was referenced in the reference list (as opposed to the anti-reference list). For instance, if the entry (g,d1) was found in the reference list of item f, the entry (d1, +) would be added to list p. If list p already includes an entry with the same item name (e.g., d1, –), the reference count module ensures that the entry is set to (item name, +).

The reference count module 1320 also searches the anti-reference list to find 2140 all entries in the anti-reference list with generation g. For each of the entries in the anti-reference list with generation g, the reference count module 1320 adds 2140 an entry (item name, −) to list p, where the "−" means that the item was referenced in the anti-reference list. If list p already includes an entry with the same item name, the reference count module ensures that the entry is set to (item name, −).

The reference count module 1320 then sets 2050 n=n+1 for each entry in list p with a "+." Recall that n is initially set to zero. The reference count module 1320 then determines 2160 whether generation g has any child generations (i.e., generations derived from generation g). If not, the reference count is complete 2170, and n is the number of references to item f. If generation g has child generations, for each child generation the reference count module 1320 sets 2180 g equal to the generation ID of the child generation and returns to step 2130.

Figure 22:
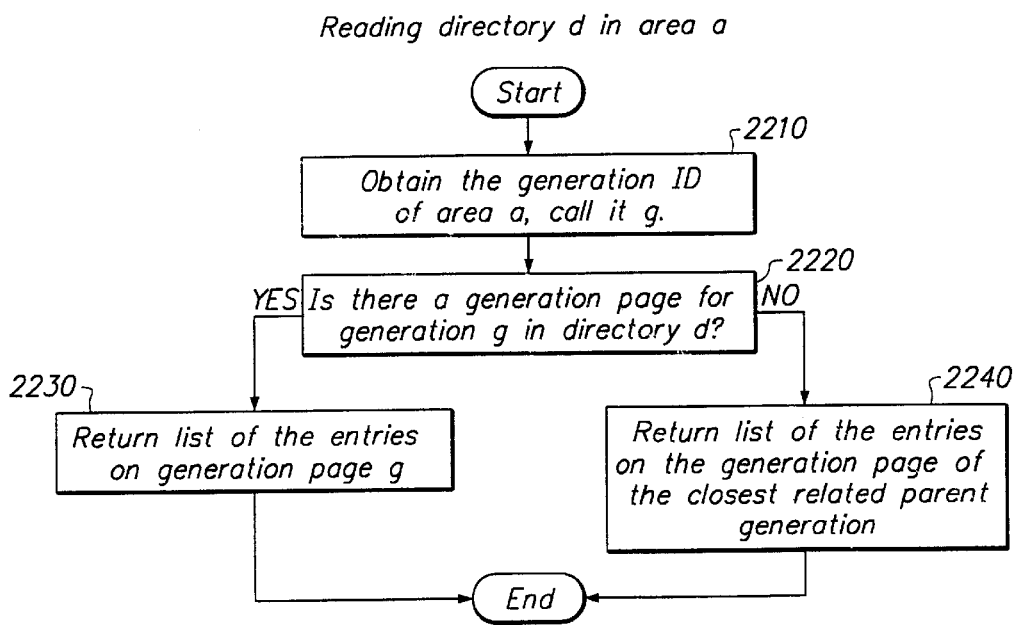
FIG. 22 illustrates an operation of a read directory module according to one embodiment of the present invention.

FIG. 22 illustrates the operation of the read directory module 1326 for reading the contents of a directory "d" in an area "a." The read directory module 1326 obtains 2210 the generation of area a, which will be referred to as "g." The read directory module 1326 parses through the directory to determine 2220 whether there is a generation page for generation g. There will be a generation page for generation g if directory d has already been modified in area a. If there is a generation page for generation g, the read directory module 1326 returns 2230 a list of the entries on the generation page "g." Otherwise, the directory returns 2240 a list the entries on the generation page of the closest related parent generation page ("best match generation page").

An example of the operation of the read directory module will be described using the directory illustrated in FIG. 12. To read the contents of the directory in an area having generation G3, the read directory module 1326 returns a list of the entry(ies) on generation page G3, which is the entry (m, h0) in this example.

Assume the generations in FIG. 12 are related in the manner as illustrated in FIG. 10. To read the contents of directory d in generation G4, the read directory module 1326 determines whether there is a generation page for G4. Since there is not a generation page for G4, the read directory module 1326 searches for the best match generation page. G1 is the closest parent generation to G4, but there is no generation page for G1. G0 is the next closest parent generation, and since there is a generation page for G0, a list of the entries in the G0 generation page is returned as the contents of the directory in G4.

Figure 23A:
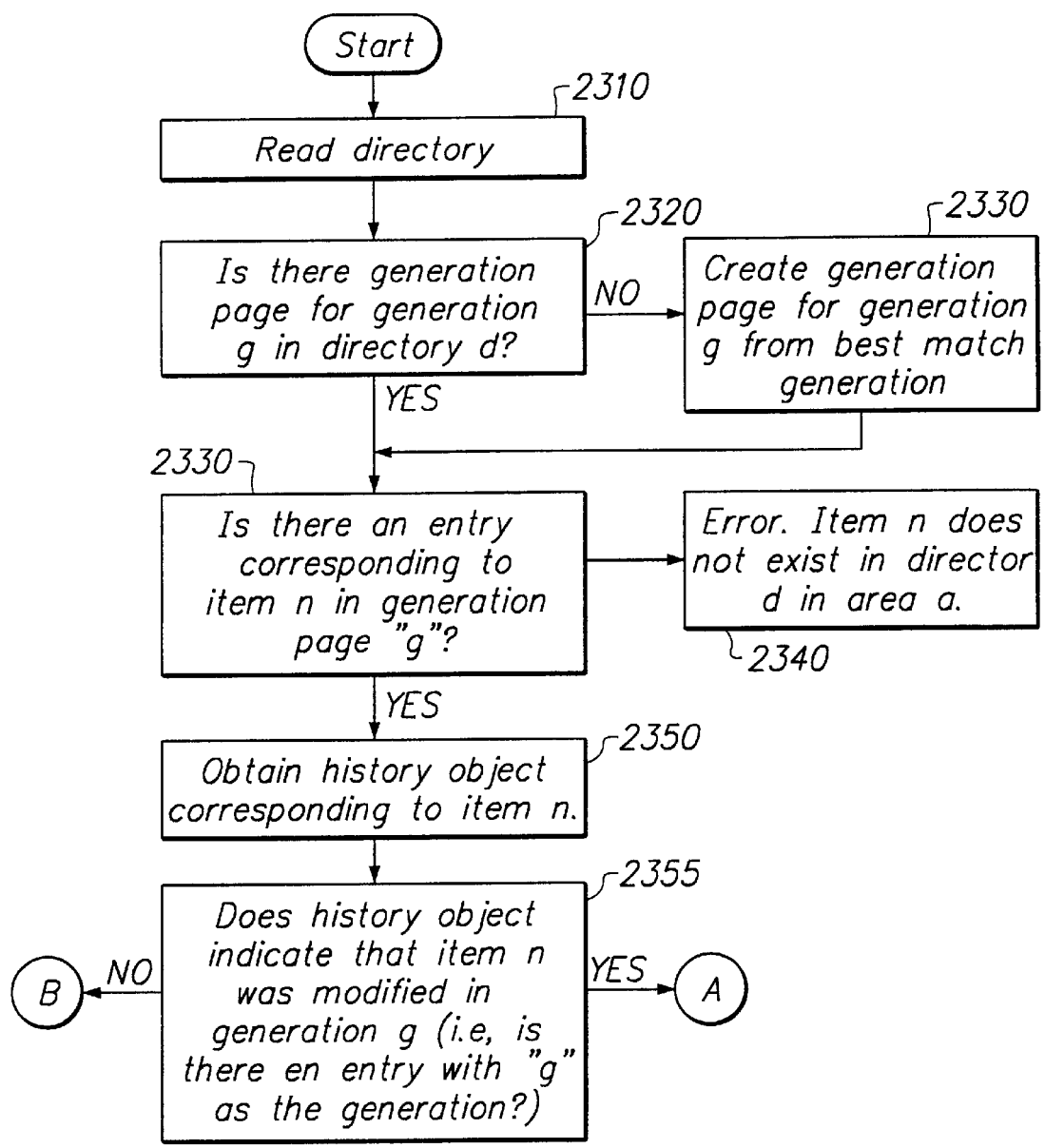
FIGS. 23a–b illustrate an operation of a remove item module according to one embodiment of the present invention.
Figure 23B:
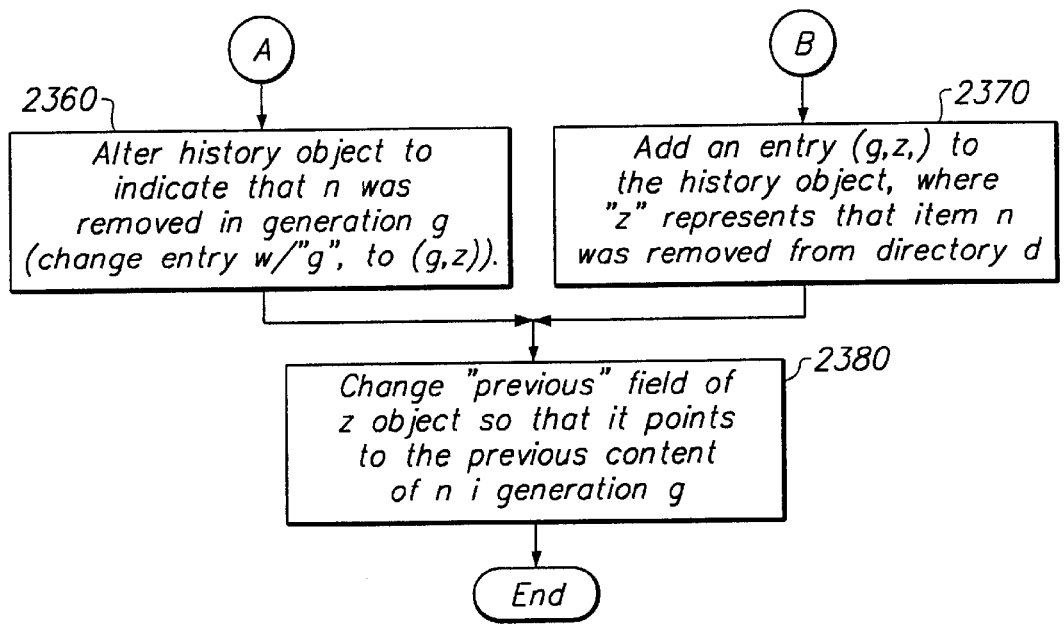

FIGS. 23a–b illustrate the operation of the remove item module 1328 when an item "n" is removed from a directory "d" in area "a" having a generation ID "g." Item n can be any object in a directory, such as a file or another directory. To remove an item from a directory d, directory d is 2310 read in accordance with the method described with respect to FIG. 22. The remove item module 1328 determines 2320 whether there is a generation page for generation g in directory d. If not, a generation page is created 2330 for generation g by copying the generation page from the closest parent generation ("best match generation").

The remove item module 1328 determines 2330 if there is an entry for item n in the generation page "g." If not, the remove item module 1328 indicates 2330 that an error has occurred because item n is not in directory d in generation g and, therefore, cannot be removed from the directory in generation g.

Returning to step 2330, if there is an entry for item n in generation page g, the remove item module 1328 obtains 2350 the history object corresponding to n. The remove item module 1328 determines 2355 whether the history object indicates that item n was modified in generation g. In other words, the remove item module 1328 determines whether the history object includes an entry with "g" as the generation.

If item n was not altered in generation g, the remove item module 1328 adds 2370 an entry to the history object indicating that item n was removed from directory d in generation g. Since the deletion of item n is virtual in this process, adding this entry effectively deletes item n from directory d in generation g. This entry is represented by the notation (g,z), where "z" represents an object that indicates that an item has been removed. If a z object has not been created for item n, the remove item module 1328 creates a z object.

Referring to step 2355, if item n has been altered in generation g, the remove item module 1328 alters 2360 the entry in the history object corresponding to generation g to indicate that n was removed from directory d in generation g (i.e., the entry becomes (g,z)). The remove item module 1328 creates a z object for item n if one does not already exist.

Like the file contents 1235 illustrated in FIG. 12, a z object also has a field that indicates the previous contents of an item. This field is referred to as the "previous field". After steps 2360 or 2370, the previous field in the z object is set 2380 to point to the previous contents of n in generation g.

Figure 24A:
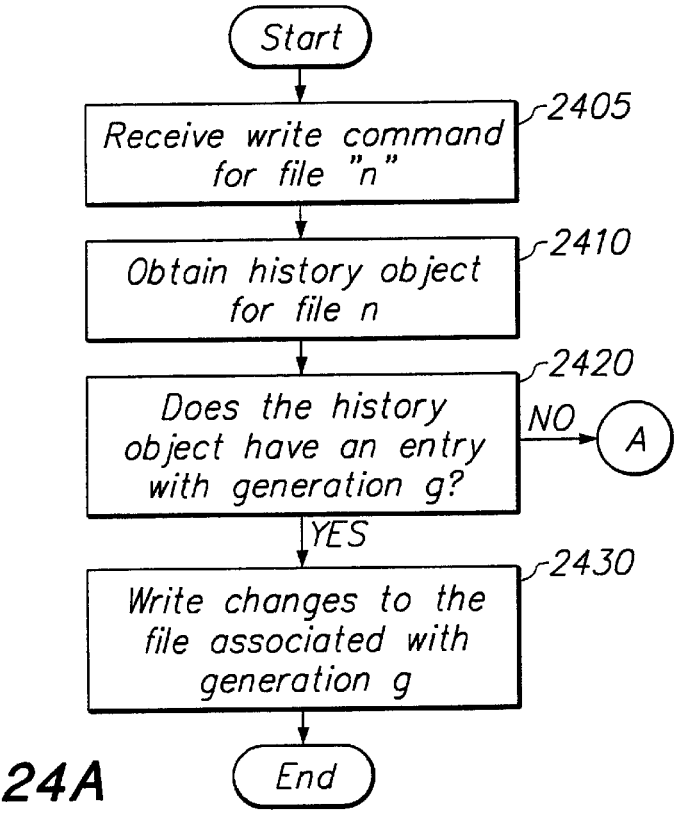
FIGS. 24a–b illustrate an operation of an edit file module according to one embodiment of the present invention.
Figure 24B:
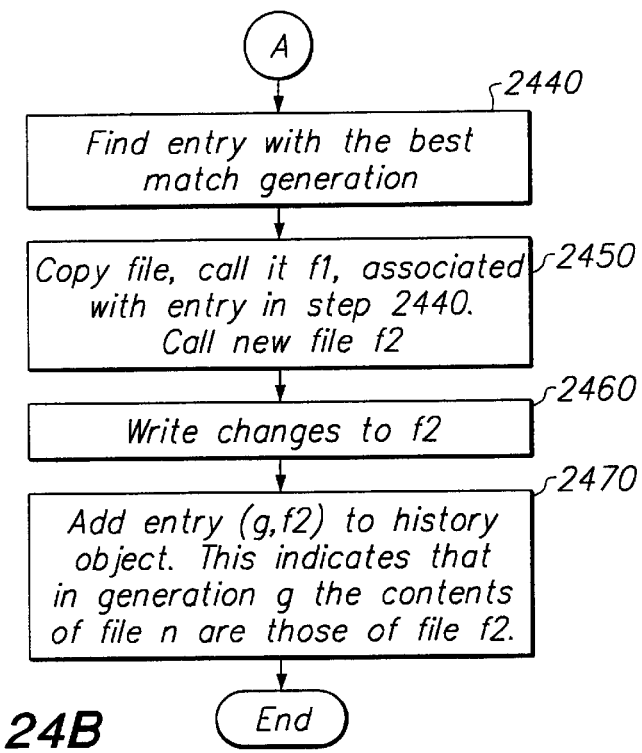

FIGS. 24a–b illustrate the operation of the edit file module 1320 for editing a file "in" in a directory "d" in a work area "a" having a generation ID "g." The edit file module 1320 receives 2405 a write command for file "n." The edit file module 1320 then obtains 2410 the history object for file n, and determines 2420 whether the file n has been altered in generation g (i.e., is there an entry with generation g?). If so, the edit file module 1320 writes 2430 all changes to file "n" to the contents associated with file n in generation g.

If the history object does not have an entry with generation g, the edit file module 1320 finds 2440 an entry with the best match generation. The edit file module 1320 then copies 2450 the file, call it f1, associated with the entry in step 2440, and it writes 2460 all changes to the new copy of file f1, which is referred to as f2. An entry is added 2470 to the history object indication that, in generation g, the contents of file n are those of file f2. In other words, the edit file module 1320 adds the entry represented by the notation (g, f2) to the history object.

Figure 25:
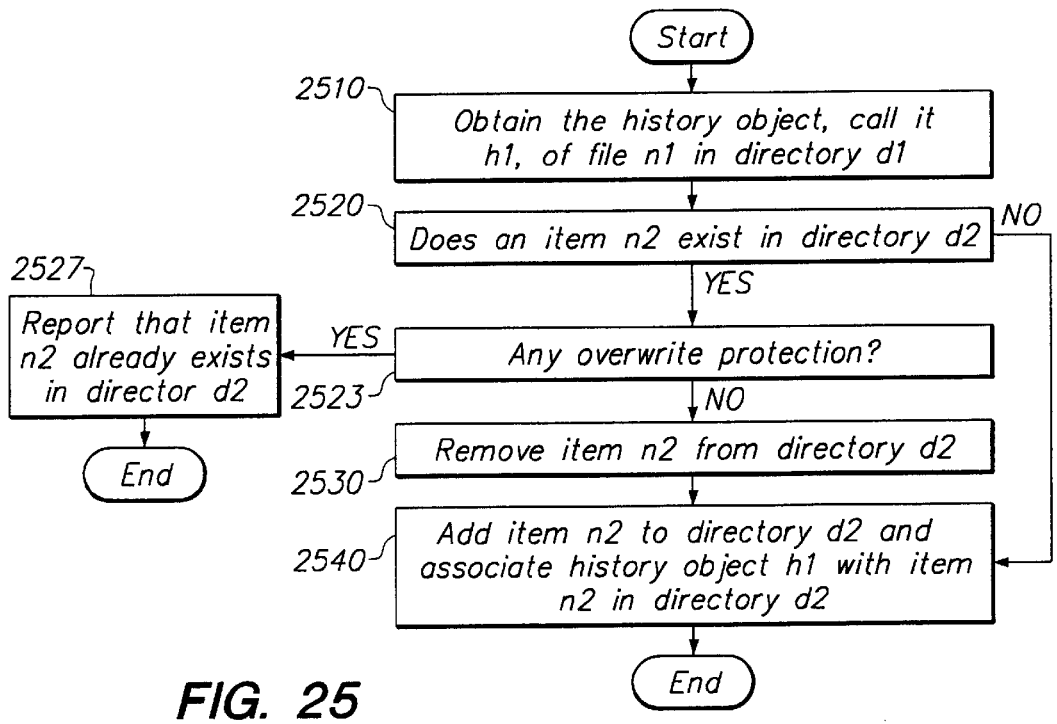
FIG. 25 illustrates an operation of the rename module according to one embodiment of the present invention.

FIG. 25 illustrates the operation of the rename module 1332 for renaming an item n1, which may be a file or a directory, in directory d1 in area a to item n2 in directory d2 in area a. The rename module 1332 obtains 2510 the history object, which will be called h1, of item n1 in directory d1. Note that if no such history object exists, the rename module 1332 reports to the user that an error has occurred. After obtaining the history object, the rename module 1332 determines 2520 whether an item with the name n2 exists in directory d2. If so, the rename module determines 2523 whether there is any overwrite protection for item n2. In one embodiment, there is overwrite protection for directories, but not for files. If overwrite protection exists, the rename module reports 2527 that an item n2 already exists in directory d2. If there is no overwrite protection, the rename module 1332 removes 2830 the existing item n2 from directory d2 in accordance with the method illustrated in and described with respect to FIGS. 23a–b.

Once the existing item n2 has been removed from directory d2 or if item n2 did not exist in directory d2, the rename module 1332 adds 2540 a new item with the name n2 to directory d2. The rename module 1332 associates history object h1 with item n2 in directory d2. In the "previous field" of the contents of item n2, the rename module 1332 indicates that n1 is the "rename from ancestor" (as defined below) of n2. Note that the rename process is the same if d1=d2.

Figure 26A:
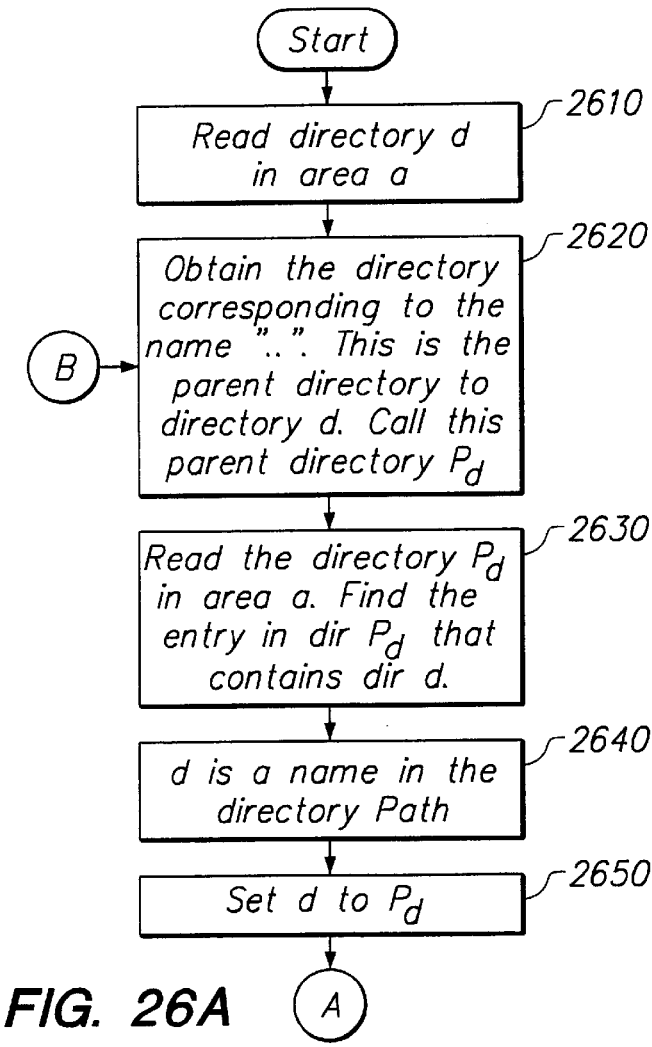
FIGS. 26a–b illustrate an operation of the generate directory path module according to one embodiment of the present invention.
Figure 26B:
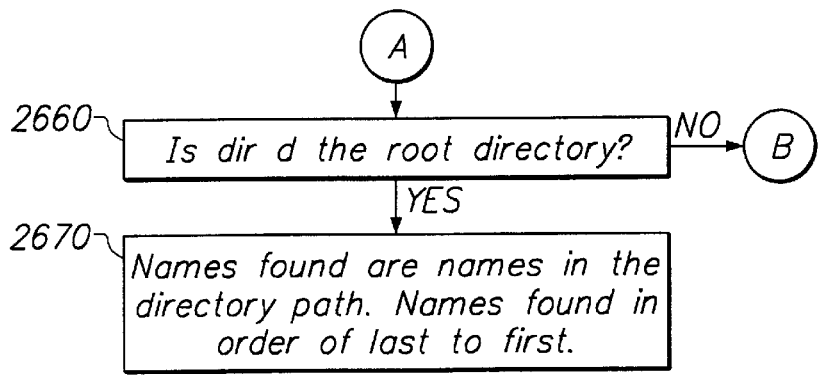

FIGS. 26a–b illustrate the operation of the generate directory path module 1334 for generating a full name path for directory d in area a. The generate directory path module 1334 reads directory d in area a and identifies the parent directory, call it $P_d$, to directory d. According to one embodiment of the present invention, a parent directory is associated with the entry " . . . " in a directory. In this embodiment, the generate directory path module 1334 identifies the directory corresponding to the entry " . . . ".

The module 1334 reads directory $P_d$ in area a, and finds the entry for directory d. The module 1334 then identifies directory d as a name in the directory path.

This algorithm is repeated until the root directory is reached. Specifically, the method described above with respect to directory d is repeated for directory Pd and then the parent of directory Pd, and so on until the root directory is reached. The names that are found are the names in the directory path. The names are found in order of last to first in the directory path name.

Figure 27:
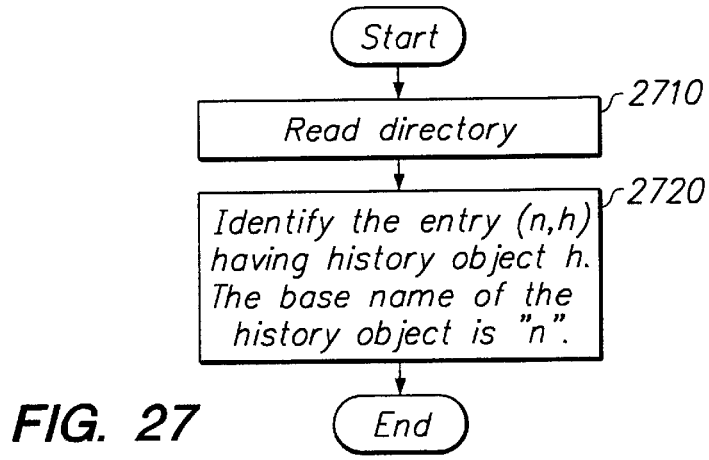
FIG. 27 illustrates the operation of a generate base name module according to one embodiment of the present invention.

FIG. 27 illustrates the operation of the generate base name module 1335 for generating the base name of a history object "h" in directory "d" in area "a." The generate base name module 1335 reads 2710 the generation page corresponding to area a in directory d. The generate base name module 1335 identifies 2720 the entry with history object h. The name of the item corresponding to history object h in the entry is the base name sought. For instance, if the entry (n,h) was found in directory d in area a, "n" would be the base name of history object h.

Figure 28A:
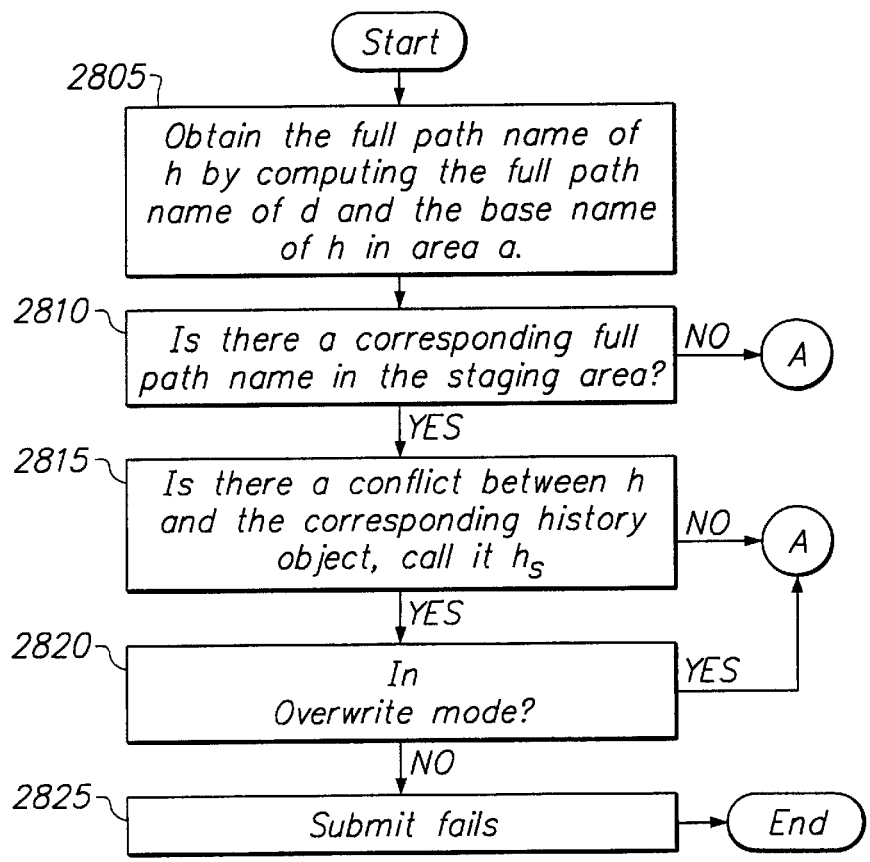
FIGS. 28a–c illustrate the operation of a submit module according to one embodiment of the present invention.
Figure 28B:
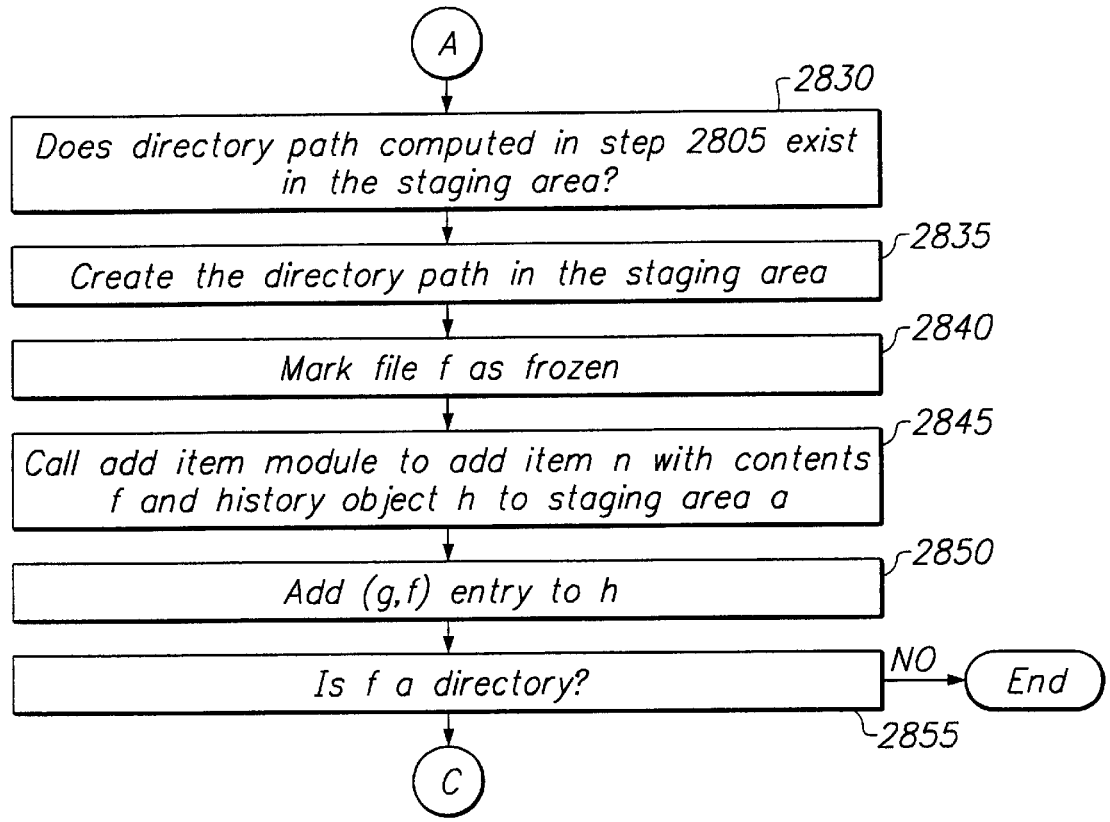
Figure 28C:
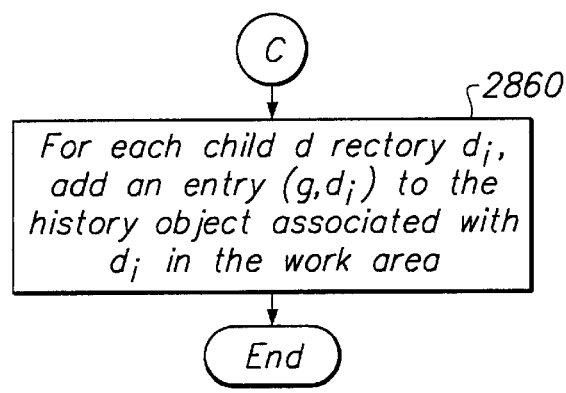

FIGS. 28a–c illustrate the operation of the submit module 1336 for submitting an item "n" with history object h and contents f to a directory d in staging area a having generation ID g. The submit operation is used to submit the contents of a work area to a staging area. Since the contents of a file are defined by its history object, the history object of a file is what is actually submitted to the staging area. The submit module 1336 obtains 2805 the full path of the history object h by computing the full path name of directory d and the base name history object h in area a, in accordance with the methods illustrated in and described with respect to FIGS. 26 and 27. The submit module 1336 determines 2810 if there a corresponding item with the same full path name in the staging area. This is done by repeatedly reading directory d (with read directory module 1326) to determine whether another object in the staging area has the same full path name as history object h.

If there is not a corresponding item in the staging area, the submit module 1336 ascertains 2830 whether the directory path computed in step 2805 exists in the staging area. If it does not, the directory path is created 2835, and file f is marked 2840 frozen. After step 2830 or step 2840, the submit module 1336 calls the add item module 1318 to add 2845 item n with contents f to directory d in staging area a. The submit module 1336 adds 2840 entry (g,f) to history object.

The submit module 1336 then determines 2855 if item f is a directory. If not, the submit process is complete. If item f is a directory, then for each child directory $d_i$, the submit module 1336, adds an entry (g,$d_i$) to the history object associated with $d_i$ in the work area. This step ensures that, when a directly is submitted to a staging area, its child directories are also submitted.

Returning to step 2810, if there is a corresponding item in the staging area, the submit module 1336 calls the conflict checking module 1338 (described below) to determine 2815 whether there is a conflict between the corresponding history object, call it $h_s$, and history object h. History objects h and $h_s$ are not in conflict if a) h and $h_s$ are the same or b) h derives from $h_s$ or c) $h_s$ derives from h. If there is not a conflict between h and the corresponding history object $h_s$, the submit module 1336 proceeds to step 2840. Otherwise the submit module 1336 determines 2820 whether the overwrite mode, which allows an existing file to be overwritten, is in effect. Is so, the submit module 1336 proceeds to step 2840. If not, the submit fails because of the conflict.

Figures 29, 30A:
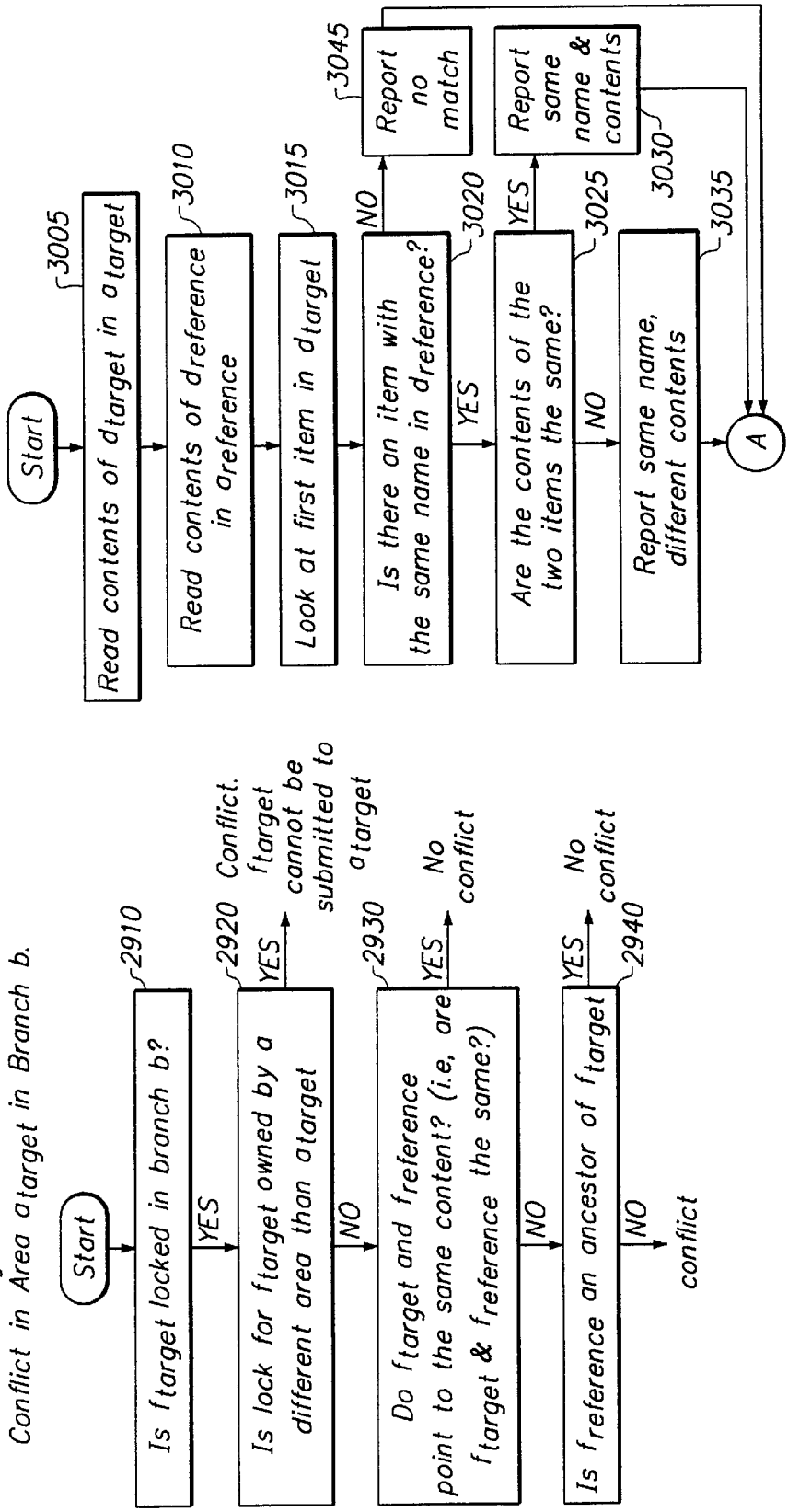

FIG. 29 illustrates the operation of the conflict checking module 1338 for checking a file $f_{target}$ against a file $f_{reference}$ for conflict in area $a_{target}$ in branch b. The conflict checking module 1338 determines 2910 whether $f_{target}$ is locked in branch b. A file is locked in a branch if only one work area on the branch can submit the file to the staging area. Locking a file provides a means to avoid conflicts. If $f_{target}$ is locked in branch b, the conflict checking module 1338 determines 2920 whether the lock for $f_{target}$ is owned by a different area than $a_{target}$. If so, there is a conflict and $f_{target}$ cannot be submitted to area $a_{target}$.

If $f_{target}$ is not locked in branch b or if the lock for $f_{target}$ is owned by $a_{target}$, the conflict checking module ascertains 2930 whether $f_{target}$ and $f_{reference}$ point to the same content (i.e., are $f_{target}$ and $f_{reference}$ the same?). If they point to the same content, the conflict checking module 1338 finds that there is no conflict. If the two files do not have the same content, the conflict checking module 1338 determines 2940 whether $f_{reference}$ is an ancestor (i.e., a same-name-ancestor, a copy-from-ancestor, or a rename-from-ancestor as defined below) of $f_{target}$. If $f_{reference}$ is an ancestor, there is no conflict because $f_{target}$ is likely a desired modification of $f_{reference}$. Otherwise, there is a conflict.

FIGS. 30a–b illustrates the operation of the compare directory module 1340 for comparing a directory $d_{target}$ in area $a_{target}$ against directory $d_{reference}$ in area $a_{reference}$. To do the comparison, the compare directory module 1340 reads 3005 the contents of directory $d_{target}$ in area $a_{target}$ in accordance with the method illustrated in and described with respect to FIG. 22. The conflict checking module also reads 3010 the contents of directory $d_{reference}$ in area $a_{reference}$ in accordance with the method illustrated in and described with respect to FIG. 22.

The compare directory module 1340 identifies 3015 the first item in directory $d_{target}$, and determines 3020 whether there is an item in directory $d_{reference}$ with the same name as the first item in directory $d_{target}$. If not, the compare directory module 1340 reports 3045 that there is no item in $d_{reference}$ that matches the identified item in $d_{target}$ and proceeds to step 3050. Otherwise, the compare directory module 1340 determines 3025 whether the two items with the same name have the same contents. Such a comparison is done by looking at the history object of each item, and if the history object of $d_{reference}$ in area $a_{reference}$ points to the same contents as the history object of $d_{target}$ in area $a_{target}$, the contents of the directories are the same. If the contents are the same, the compare directory module 1340 reports 3030 that the items have the same name and contents, and the compare directory module 1340 proceeds to step 3050. If the contents are not the same, the compare directory module 1340 reports 3035 that the names are the same, but not the contents, and the compare directory module 1340 proceeds to step 3050.

In step 3050, the compare directory module 1340 ascertains 3050 whether there is another item in $d_{target}$. If there is another item in $d_{target}$, the compare directory module 1340 identifies 3053 the next item and returns to step 3020. If there is not another item in $d_{target}$, the compare directory module 1340 identifies 3055 the first item in $d_{reference}$. The compare directory module 1340 determines 3060 whether the identified item has the same name as an item in $d_{target}$. If not, the compare directory module 1340 reports 3065 that the identified item in $d_{target}$ does not match any item in $d_{reference}$ and proceeds to step 3067. If the identified item has the same name as an item in $d_{target}$, the identified item was already found in step 3020, and, thus, the compare directory module 1340 proceeds to step 3067.

In step 3067, the compare directory module 1340 determines whether there is another item in directory $d_{reference}$. In response to there being no more items in $d_{reference}$, the process for comparing $d_{target}$ to $d_{reference}$ is complete. Otherwise, the compare directory module 1340 obtains 3070 the next item in $d_{reference}$ and returns to step 3060.

The compare file module 1341 compares files (as opposed to the compare directory module 1340 which compares directories). Files are compared when they are submitted to a staging area. Additionally, website developers may wish to compare files in their respective work areas.

Comparing files includes looking at the ancestors of a file. Three types of ancestors a file may have are a same-name-ancestor, a copy-from-ancestor, and a rename-from-ancestor.

A same-name-ancestor is a previous version of a file, call it f, having the same name as file f (i.e., "f"), where the same-name-ancestor was previously submitted to the same area as file f. The "previous field" (e.g., field 1240 in FIG. 12) of a file points to the same-name-ancestor of the file.

A copy from ancestor of a file, call it f, is a file whose contents were copied into file f. A copy to or revert operation on a file may produce a file in a work area with a copy-from-ancestor. This occurs if the operation overwrites an existing file. For instance, let file e2 be a file in a staging area. Let file u be a file in a work area that is in conflict with file e2. If file u is updated by replacing the contents of file u with a copy of the contents of file e2, the old file u is the same-name-ancestor of the updated file u, and file e2 is the copy-from-ancestor of the updated file u. File e2 can be a file from another area or another branch. File e2 can also be a file in the version history of file u or a file in a version history of another file on another branch. If a file has a copy-from-ancestor, the "previous field" (e.g., field 1240 in FIG. 12) of that file points to the copy-from-ancestor, as well as to the same-name-ancestor.

A rename-from-ancestor of a file, call it f, is the is the file from which file f is renamed. If a file has a rename-from-ancestor, the "previous field" of the file points to the rename-from-ancestor, as well as the same-name-ancestor.

Figure 31A:
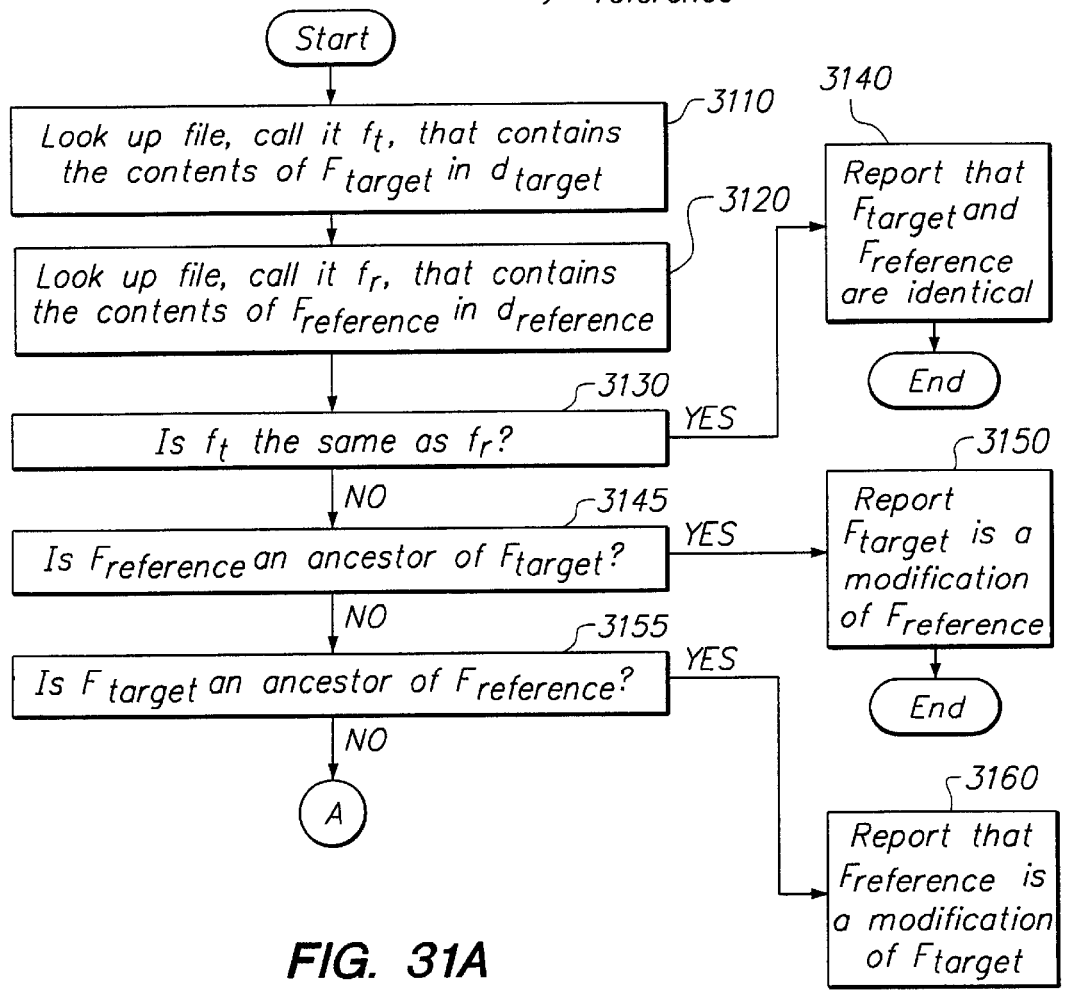
FIGS. 31a–b illustrate the operation of a compare file module according to one embodiment of the present invention.
Figure 31B:
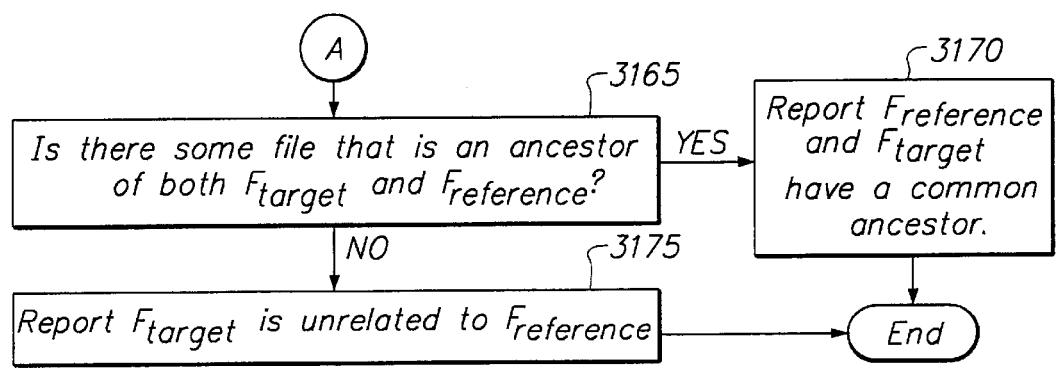

FIGS. 31*a–b* illustrate the operation of the compare file module 1341 for comparing a file $F_{target}$, in directory $d_{target}$ to a file $F_{reference}$, in directory $d_{reference}$. The compare file module 1341 looks up 3110 the file, call $f_t$, that contains the contents of $F_{target}$ in directory $d_{target}$. Note the difference between $F_{target}$ and $f_t$ is that $F_{target}$ is the name of the file in the directory, whereas, ft is the actual contents of $F_{target}$ in directory $d_{target}$. The difference between $F_{target}$ and $f_t$ is like the difference between the file named "m" in the directory illustrated in FIG. 12 and the contents, "A", of file "m" in generation G0.

The compare file module 1341 looks 3120 up the file, call it $f_r$, that the contains the contents of $F_{reference}$ in $d_{reference}$ The compare module then determines 3130 whether $f_r$ and $f_t$ are identical. If so, then the compare file module 1341 reports 3140 that $F_{reference}$ and $F_{target}$ are identical.

If $f_r$ and $f_t$ are not identical, the compare file module 1341 determines 3145 whether $F_{reference}$ is an ancestor of $F_{target}$. Recall that the contents of each file contain a pointer (in the "previous field") to the same-name-ancestor of the file (e.g., the previous contents) and, if the file has a copy-from-ancestor or a rename-from-ancestor, to such ancestor. The compare module traverses back through the "previous field" of $f_t$ and its ancestors in search of $f_r$. If $f_r$ appears in one of the "previous fields" traversed, then $F_{reference}$ is an ancestor of $F_{target}$, and the compare file module 1341 reports 3050 that $F_{target}$ is a modification of $F_{reference}$.

If $F_{reference}$ is not an ancestor of $F_{target}$, the compare file module 1341 determines 3155 whether $F_{target}$ is an ancestor of $F_{reference}$. Specifically, the compare module traverses back through the "previous field" of $f_r$ and its ancestor in search of $f_t$. If $f_t$ appears in one of the "previous fields" traversed, the compare file module 1341 reports 3160 that $F_{reference}$ is a modification of $F_{target}$. Otherwise, the compare file module 1341 determines 3165 whether there is some file that is an ancestor of both $F_{target}$ and $F_{reference}$. If there is some common file, the compare file module 1341 reports 3170 $F_{reference}$ and $F_{target}$ have a common ancestor, and, if there is not a common file, it reports 3175 that $F_{target}$ is unrelated to $F_{reference}$.

The area deletion module 1342 deletes areas that are no longer desired by a user or system administrator. FIG. 32 illustrates the operation of the area deletion module 1342 for deleting an area "a." The area deletion module retrieves 3210 the directory tree for area a, and finds 3230 any childless node (i.e., directory), which will be called the "c node" for convenience. The area deletion module 1342 calls the remove item module 1328 to remove 3240 the c node from its parent directory (ies). The area deletion module 1342 also calls the remove direct reference module 1324 to remove 3240 the reference to the parent directory from the reference list of the c node. The area deletion module 1342 then calls the reference count module 1320 to determine 3260 whether the reference count is zero, and, if it is zero, the physical object associated with the c node is deleted 3270 from storage. Otherwise, the physical object associated with the c node is not deleted from storage because, although the c node has been removed from area a, it still exists in other areas. After determining the reference count, the delete area module 1342 determines 380 whether there are any nodes left in the area. If so, the module 1342 returns to step 3230. If not, the area deletion process is complete.

FIGS. 33*a–b* and 34 illustrate the operation of the lock module 1346. FIGS. 33*a–b* illustrate the operation of the lock module 1346 for creating a lock on item f in directory d in area a along branch b. To create such a lock, the lock module 1346 determines 3310 the full path name of item f in directory d in area a and then ascertains 3320 whether any other lock has the same full path name. If so, the lock module 1346 reports 3250 that the lock creation operation failed because of a conflicting lock. If no other lock has the same full path name, the lock module 1346 creates 3230 a lock that includes the full path name identified in step 3310 and marks 3240 the lock with area a as the owner of the lock.

FIG. 34 illustrates the operation of the lock module 1346 for determining whether an item in directory d in area a is locked. The lock module 1346 ascertains 3410 the full path name of item f in directory d in area a and then determines 3420 whether branch b has a lock with the same full path name. If not, the lock module reports 3430 that item f is not locked. Otherwise, the lock module reports 3440 that item f is locked.

Now that the website development software has been described, the HTTP protocol virtualization module 137 ("the virtualization module 137"), according to one embodiment, will be described.

Each area appears to be a complete website at the HTTP protocol level. To accomplish this without having a separate web server for each area, virtualization module 137 enables a single web server to appear as multiple web servers. This greatly reduces deployment and maintenance costs while allowing each area to be a complete website at the HTTP protocol level.

Figure 35:
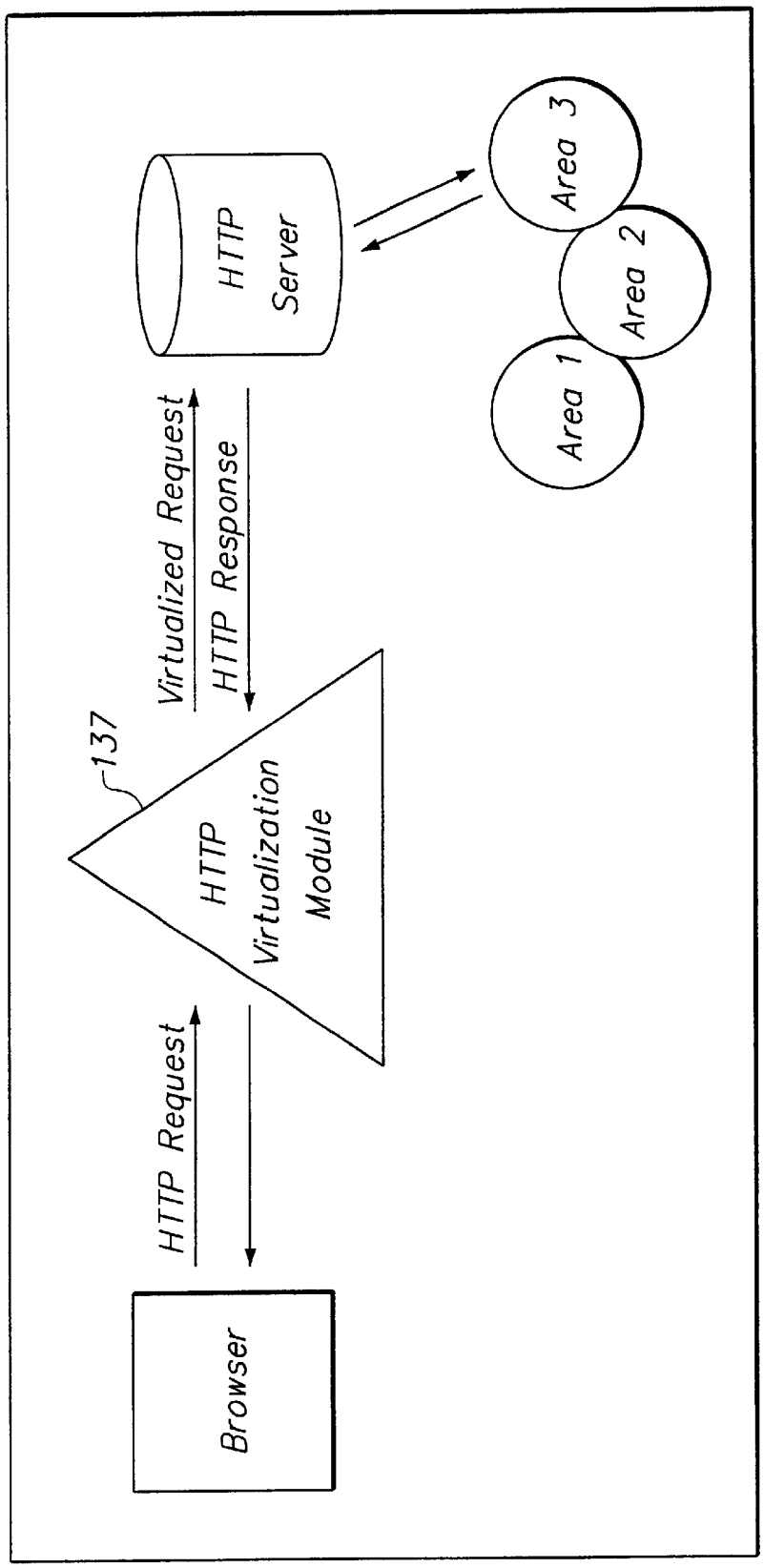
FIG. 35 illustrates a communication path between a web browser, a HTTP protocol virtualization module, and a web server, according to one embodiment of the present invention.

FIG. 35 illustrates the communication path between a web browser on one of the development workstations 110, the virtualization module 137, and the web server 145. The web browsers on the development workstations 110 are directed to route all or select (depending on the type of links as discussed below) HTTP requests for website content to the virtualization module 137. If needed the virtualization module 137 alters the directory path of the request so that the directory path corresponds to the area from which the request originated (this area is referred to as the "viewing area") or another desired location (as discussed below). In other words, HTTP requests sent to virtualization module 137 are redirected, if needed, to the file system corresponding to the viewing area or another desired location.

After processing an HTTP request, the virtualization module 137 forwards the HTTP request to the web server 145, which retrieves the requested document from the location specified by the request. The web server 145 then sends the requested document (or an error signal if it is not found) back to the virtualization module 137, which forwards the requested document (or error signal) back to the web browser.

The virtualization module 137 uses mapping rules to determine whether and how to alter an HTTP request. A mapping rule maps one expression to another expression. A mapping rule is broken down into two sides separated by an equal sign. The left hand side of a mapping rule is a regular expression, which defines the parts of a variable pattern to be matched. The regular expressions of the mapping rules follow well defined rules of regular expressions in the fields of mathematics and computer science, and, in one embodiment, the regular expressions used in the mapping rules are applied the same way that regular expressions are applied in the UNIX operating system (e.g., regex(5) extended regular expressions).

The right hand side of the mapping rule is the substitute expression (i.e., the expression substituted for the regular expression on the left hand side). In the substitute expression, the symbol $N, where N is "1", "2", . . . "9", represents the first ten parts of a pattern on the left hand side that are represented by the regular expression parentheses operator ( ) (e.g., $1 represents the first pattern on the left side, $2 represents the second pattern on the left side, and so on).

A HTTP request can be divided up into three parts in the following order:

area prefix/document root prefix/name of requested file

The module 137 redirects HTTP requests by altering the document root prefix and the area prefix of the request. The document root prefix is the path name of the "document root," where the document root is the source directory for the web server. The document root is the directory in the file system under which the web server searches for requested documents (unless otherwise specified). The document root can be thought of as the webserver's notion of its root directory.

The top level directory of an area is not necessarily the document root. A developer may set up an area such that the top level directory of an area does not correspond to the document root of the web server. The actual document root for the web server may live any number of directories beneath the top area directory.

The document root for an area is specified by a special mapping rule. In one embodiment, each branch has a set of mapping rules, and, in this embodiment, each area along a particular branch has the same document root as specified by the special '_docroot' mapping rule.

An example of a mapping rule for the document root of a particular branch is as follows:

_docroot=/directoryA/directoryB

If the original URL request is GET /documents/idex.html, the document root prefix will be appended directly in front of the first "/" of the original request. In other words, the prefix "/directoryA/directoryB" will be appended to the front of "/documents/index.html".

There are situations where it is desirable to use another prefix instead of the document root prefix. Such situations include where a developer configures content directories outside the document root directory, aliases the name of a content directory, or applies an arbitrary transformation at the area level. There are mapping rules for these special situations, and, if the request matches one of these special mapping rules, the substitute expression (right hand side) of the mapping rule is the prefix appended to the request instead of the document root prefix. For instance, assume the following is a mapping rule for a particular branch:

/Special(.*)=/Foo$1

If the original request is GET /special/index.html, the prefix "/Foo" is added to "/index.html."

The area prefix is appended to the front of the document root prefix or, if applicable, the special prefix that replaces the document root prefix. The area prefix is derived by decoding the "cookie" transmitted with the original request. A cookie is a small amount of persistent data stored by the web browser and passed to the virtualization module 137. A cookie can include various types of information (e.g., the identity of the user, the identity of a user's session ("session ID"), port number, etc.), and one such type may be an indication of the path of the viewing area. In one embodiment, the cookie includes the actual area prefix. In another embodiment, the virtualization module extracts another type of information, such as a session ID or a port number, from the cookie and looks up the area prefix in an external look up table that maps the type of information extracted to area prefixes.

To continue the document root prefix example, if the area prefix derived from the cookie transmitted with the original request is "/iw-mount/default/main/workarea/joe", the transformed request will look as follows:

GET /iw-mount/default/main/workarea/joe/directoryA/directoryB/ documents/index.html.

Whether a web browser routes all HTTP requests to the virtualization module 137 or just some depends on the types of link contained within the HTML documents in the system. There are at least three different types of links which may be contained within an HTML document, namely a relative link, an absolute link, and a fully qualified link. A fully qualified link is a link that includes an explicit protocol specification and an explicit hostname followed by the full pathname to a document. An absolute link is a link that contains neither a protocol specification nor a hostname, but does contain a full pathname to a document. An absolute link usually starts with an initial slash character ('/'). A relative link is similar to an absolute link, but is instead characterized by the leading slash character ('/'), which indicates that the path is relative to the current document's link. In other words, a relative link has the same full path name of the current document except for the actual name of the document requested.

The virtualization module 137 can process all three types of links If the HTML content stored within the system 100 requires virtualization of fully qualified links, the web browser is configured to send all requests to the virtualization module 137. Many common web browsers support this feature with a configuration setting. According to one embodiment, if the website does not require management of fully qualified links, the web browser passes just absolute and relative HTML links to the virtualization module 137. A web server usually requires no special configuration for absolute and relative links to be automatically sent to the virtualization module 137.

Figure 36A:
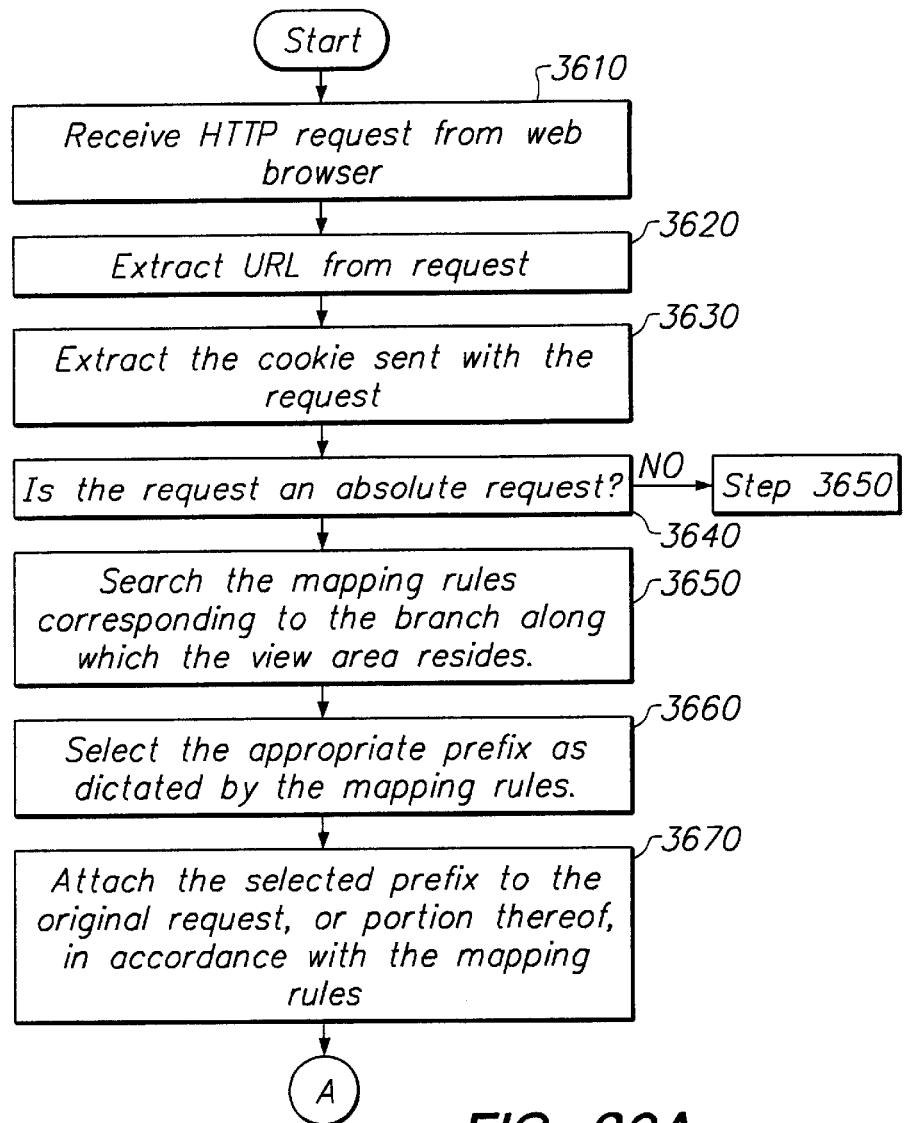
FIGS. 36a–b illustrate an operation of the HTTP protocol virtualization module according to one embodiment of the present invention.
Figure 36B:
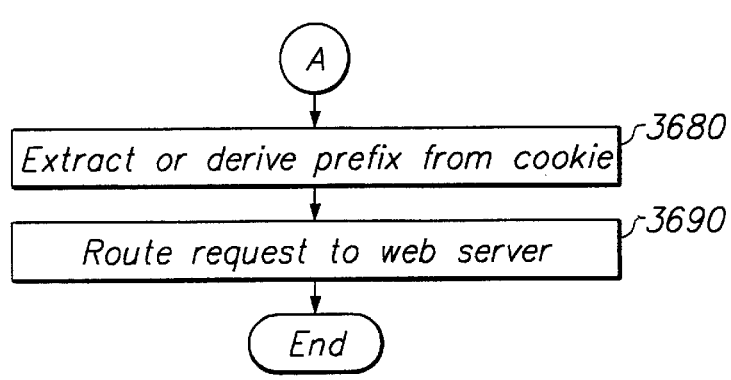

FIGS. 36a–b illustrate the operation of virtualization module 137 for handling absolute and relative requests. The virtualization module 137 receives 3610 an HTTP request from a web browser on one of the development workstations 110, and extracts 3620 the Uniform Resource Locator (URL) address from the request. The virtualization module 137 also extracts 3630 the cookie that has been sent with the URL address.

The virtualization module 137 then determines 3640 whether the request is an absolute request or a relative request. In one request embodiment, these requests are distinguished by the fact that a relative HTML request will already have an area prefix appended to it before it is processed by the virtualization module 137 (this is done automatically by the web browser), but an absolute request will not have an area prefix appended to it before it is processed by the virtualization module 137. If the request is relative, the request is already directed to the correct file system and directories (i.e., the file system and directories from which the viewing document was accessed), and the virtualization module 137 passes 3690 the request to the web server.

If the request is an absolute request, the virtualization module 137 searches 3650 the mapping rules corresponding to the branch along which the viewing area resides and selects 3660 the appropriate prefix (either a document root prefix or a special prefix based on the mapping rules (as discussed above)). The virtualization module 137 attaches 3670 the selected prefix to the original request or a part thereof in accordance with the appropriate mapping rule.

The virtualization module 137 extracts or derives (as discussed above) 3680 the area prefix from the cookie and attaches it in front of the prefix attached in step 3670. The path of the request, or a portion thereof, is now complete, and, therefore, the module 137 routes 3690 the modified request to web server 145.

Figure 37:
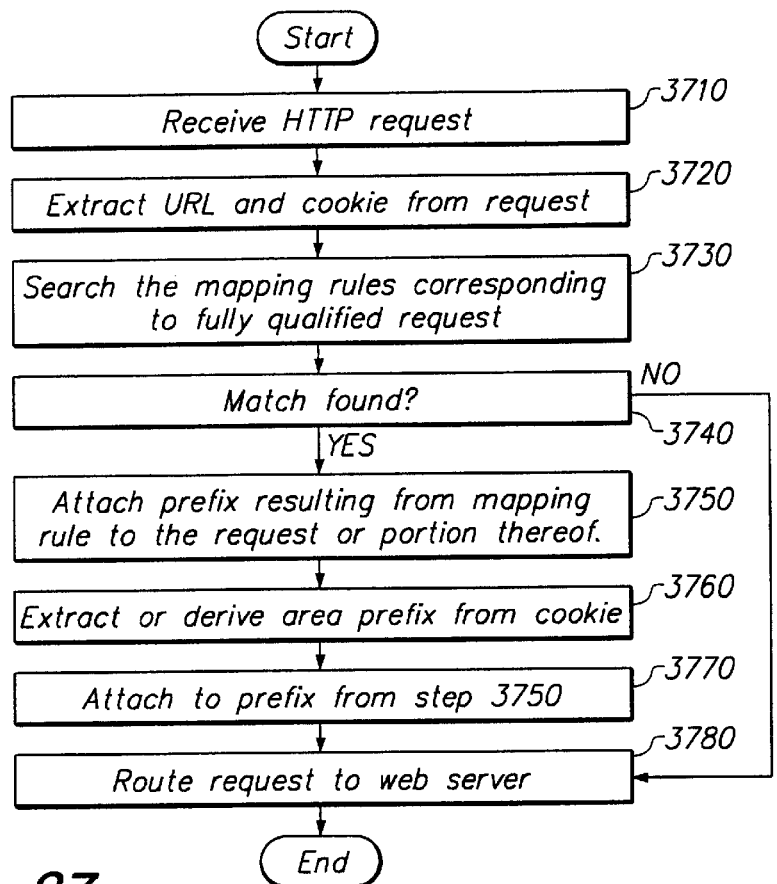
FIG. 37 illustrates another operation of the HTTP protocol virtualization module according to one embodiment of the present invention.

FIG. 37 illustrates the method of the virtualization module 137 for processing fully qualified links. The virtualization module 137 receives 3710 an HTTP request from one of the web browsers on one of the development workstations 110, and extracts 3720 the URL and the cookie from the request.

The virtualization module 137 then searches 3730 through mapping rules for fully qualified requests, and determines whether the request matches the regular expression of a mapping rule. If not, the request is forwarded 3780 to the web server as is. If so, the virtualization module 137 attaches 3756 the prefix resulting from the mapping rule to the request, or a portion thereof, in accordance with the mapping rule.

The virtualization module 137 extracts or derives (as discussed above) 3760 the area prefix from the cookie and attaches 3770 it to the front of the prefix attached in step 3750. The path of the request is now complete, and the virtualization module 137 routes 3780 the modified request to web server 145.

The virtualization module 137 allows dynamic splicing of content from an external web server. In some cases, a website may include content that is not managed by system 100. In these cases, the virtualization module 137 enables a document request to be dynamically redirected to an external web server if the document does not reside at the location originally searched (e.g., the viewing area). If a document request returns with the HTTP error code '404 File not found', the virtualization module 137 searches the mapping rules, and, if a match is found, it alters the request in accordance with the matching rules. The altered request is then sent to the specified external destination web server.

The virtualization module 137 also provides for dynamic splicing of content from different branches. In some cases, website content may be segregated into different branches of development. In these instances, if the virtualization module 137 receives an error code '404 File not found,' the virtualization module 137 replaces the existing document root prefix with the document root prefix of another branch. The altered request is then sent to the web sever 145.

Figure 38:
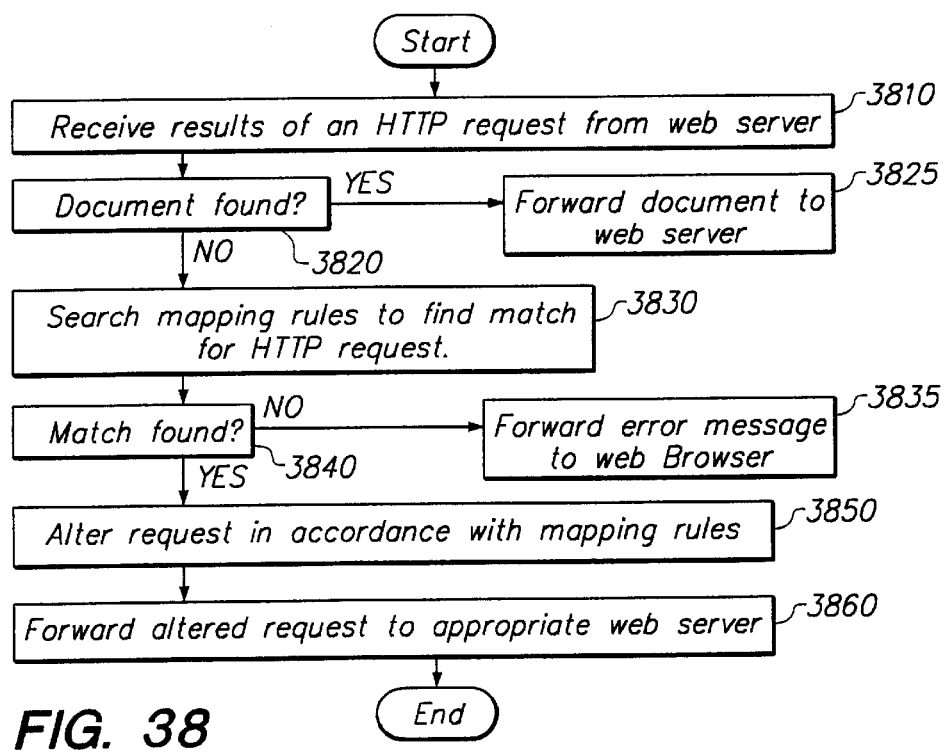
FIG. 38 illustrates yet another operation of the HTTP protocol virtualization module according to one embodiment of the present invention.

FIG. 38 illustrates the operation of the virtualization module for performing dynamic site-based or branch-based splicing. The virtualization module 137 receives the results of an HTTP request from the web server 145. The virtualization module determines from the results whether the requested document was found. If so, the virtualization module forwards 3825 the requested document to the web browser that originally sent the request to the virtualization module 137. If the document is not found, the virtualization module searches 3830 the mapping rules to determine 3840 whether the HTTP request or a portion thereof, sent to the web server matches the left hand side of any of the rules. If so, the request 3850 is altered in accordance with the mapping rules and forwarded 3860 to the appropriate web server.

As will be understood by those familiar with the art, the invention may be embodied in other specific forms without departing from the spirit or essential characteristics thereof. Website development is just one of many practical applications for the inventions disclosed herein. Other applications for the inventions disclosed herein include developing source code, media files (e.g., for CD-ROM multimedia), a media engine, and etc. Accordingly, the disclosure of the present invention is intended to be illustrative, but not limiting, of the scope of the invention, which is set forth in the following claims.

What is claimed is:

1. A method of developing and maintaining website content for use in a system having at least one work area for developing and modifying website content, a staging area for integrating content from a work area and a webserver; comprising:

receiving a request from a web browser;

extracting a URL from the request;

extracting a cookie from the request;

selecting a prefix according to a predetermined set of mapping rules;

re-mapping the URL dynamically by associating the selected prefix with at least a portion of the original request according to the mapping rules, wherein the resulting URL corresponds to a user's work area; and routing the request to the web server.

2. A method according to claim 1, further comprising:

determining whether the request is a fully qualified request;

searching the mapping rules to find a prefix that matches the fully qualified request;

if there is a match with a prefix in the mapping rules, attaching a prefix to at least a portion of the request according to the mapping rules;

extracting an area prefix from the cookie;

attaching the area prefix from the cookie to the prefix matched with the mapping rules wherein the resulting URL corresponds to a user's work area;

routing the request to the webserver; and if there is not a match, routing the request to the webserver.

* * * * *